United States Patent
Waheed et al.

(10) Patent No.: US 12,422,556 B2
(45) Date of Patent: Sep. 23, 2025

(54) SUPPORT SYSTEM FOR MOBILE COORDINATE SCANNER

(71) Applicant: FARO Technologies, Inc., Lake Mary, FL (US)

(72) Inventors: Mufassar Waheed, Ditzingen (DE); Matthias Wolke, Korntal-Münchingen (DE); Aleksej Frank, Kornwestheim (DE); Mark Brenner, Neuenstadt am Kocher (DE)

(73) Assignee: FARO Technologies, Inc., Lake Mary, FL (US)

( * ) Notice: Subject to any disclaimer, the term of this patent is extended or adjusted under 35 U.S.C. 154(b) by 214 days.

(21) Appl. No.: 18/131,526

(22) Filed: Apr. 6, 2023

(65) Prior Publication Data

US 2023/0324556 A1   Oct. 12, 2023

Related U.S. Application Data

(60) Provisional application No. 63/328,910, filed on Apr. 8, 2022.

(51) Int. Cl.
*G01S 17/89*   (2020.01)
*G01S 7/481*   (2006.01)
*G01S 17/86*   (2020.01)

(52) U.S. Cl.
CPC ............ *G01S 17/89* (2013.01); *G01S 7/4817* (2013.01); *G01S 17/86* (2020.01)

(58) Field of Classification Search
CPC ........ G01S 17/89; G01S 7/4817; G01S 17/86; G01S 7/4808; G01S 7/4815; G01S 7/51; G01S 17/42; G01S 17/931; F16M 2200/044; F16M 11/08; F16M 11/2092; F16M 2200/063; F16M 11/2014; F16M 11/24; F16M 13/04; G01C 15/002
See application file for complete search history.

(56) References Cited

U.S. PATENT DOCUMENTS

2018/0045751 A1\* 2/2018 Kearney ................. G01P 5/165
2020/0124732 A1\* 4/2020 Sutherland ............ G01S 7/4813

OTHER PUBLICATIONS

Flycam, Vista-II Stabilizer Arm & Vest (VSTA-II_AV). Retrieved online at: https://www.proaim.com/products/flycam-zest-pro-electronic-video-camera-stabilizer-with-vista-ii-arm-vest. 7 pages, Sep. 13, 2021.
Flycam, Zest Pro Electronic Stabilizer (ST-ZEST-PRO). Retrieved online at: https://www.proaim.com/products/flycam-zest-pro-electronic-video-camera-stabilizer-with-vista-ii-arm-vest. 10 pages, Sep. 13, 2021.

\* cited by examiner

*Primary Examiner* — Tony Ko
(74) *Attorney, Agent, or Firm* — McCarter & English, LLP; Dave S. Christensen

(57) ABSTRACT

A mobile three-dimensional (3D) measuring system includes a 3D measuring device, and a support apparatus. The 3D measuring device is coupled to the support apparatus. The support apparatus includes a pole mount that includes a gimbal at the top of the pole mount, wherein the 3D measuring device is attached to the gimbal. The support apparatus further includes a counterweight at the bottom of the pole mount, the counterweight matches a weight of the 3D measuring device.

18 Claims, 19 Drawing Sheets

SUPPORT SYSTEM FOR MOBILE COORDINATE SCANNER

CROSS-REFERENCE TO RELATED APPLICATIONS

The present application claims the benefit of and is a nonprovisional application of U.S. Provisional Application Ser. No. 63/328,910 filed on Apr. 8, 2022, the contents of which are incorporated by reference herein.

BACKGROUND

The present disclosure relates to a system and method that can facilitate measuring, capturing, and storing a three-dimensional (3D) representation of a surrounding environment using a mobile/portable coordinate scanner, particularly to a stabilization or support system to improve data capturing by such a scanner.

The subject matter disclosed herein relates to a 3D laser scanner ("laser scanner" or "scanner"), which can be a time-of-flight (TOF) or a phase shift coordinate measurement device. A TOF laser scanner steers a beam of light to a non-cooperative target, such as a diffusely scattering surface of an object. A distance meter in the device measures the distance to the object, and angular encoders measure the angles of the emitted light. The measured distance and angles enable a processor in the device to determine the 3D coordinates of the target. A TOF laser scanner (or simply TOF scanner) is a scanner in which the distance to a target point is determined based on the speed of light in the air between the scanner and a target point. Phase shift laser scanners determine the distance to the object by the phase shift between the outgoing and returning signal (i.e., calculating the "shift" or "displacement" of the reflective wave compared to the outgoing wave).

Laser scanners are typically used for scanning closed or open spaces such as interior areas of buildings, industrial installations, and tunnels. They may be used, for example, in industrial applications and accident reconstruction applications. A laser scanner optically scans and measures objects in a volume around the scanner by acquiring data points representing object surfaces within the volume. Such data points are obtained by transmitting a beam of light onto the objects and collecting the reflected or scattered light to determine the distance, two angles (i.e., azimuth and a zenith angle), and optionally a gray-scale value. This raw scan data is collected, stored, and sent to a processor or processors to generate a 3D image representing the scanned area or object.

Generating an image requires at least three values for each data point. These three values may include the distance and two angles or maybe transformed values, such as the x, y, z coordinates. In an embodiment, an image is also based on a fourth gray-scale value, which is a value related to the irradiance of scattered light returning to the scanner.

Most scanners direct the beam of light within the measurement volume by steering the light with a beam steering mechanism. The beam steering mechanism includes a first motor that steers the beam of light about a first axis by a first angle that is measured by a first angular encoder (or another angle transducer). The beam steering mechanism also includes a second motor that steers the beam of light about a second axis by a second angle that is measured by a second angular encoder (or another angle transducer).

Many contemporary laser scanners include a camera mounted on the laser scanner for gathering digital images of the environment and presenting the 2D digital images to an operator of the laser scanner. By viewing the camera images, the operator of the scanner can determine the field of view of the measured volume and adjust settings on the laser scanner to measure over a larger or smaller region of space. In addition, the camera's digital images may be transmitted to a processor to add color to the scanner image. To generate a color scanner image, at least three positional coordinates (such as x, y, z) and three color values (such as red, green, blue "RGB") are collected for each data point.

A 3D image of a scene may require multiple scans from different registration stationary positions. The overlapping scans are registered in a joint coordinate system, for example, as described in U.S. Published Patent Application No. 2012/0069352 ('352), the contents of which are incorporated herein by reference. Such registration is performed by matching targets in overlapping regions of the multiple scans. The targets may be artificial targets such as spheres, checkerboards, or natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station. The registration method disclosed in '352 eliminates the need for user matching of registration targets and establishing a control network.

A laser scanner is usually mounted on a tripod or instrument stand while measuring the 3D coordinates of its surroundings. An operator is required to move the tripod from location to location as measurements are taken.

Accordingly, while existing 3D scanners are suitable for their intended purposes, there is a need for apparatus and methods providing greater portability in 3D measurement according to certain features of embodiments of the present invention.

BRIEF DESCRIPTION

According to one or more aspects, a mobile three-dimensional (3D) measuring system includes a 3D measuring device, and a support apparatus. The 3D measuring device is coupled to the support apparatus. The support apparatus includes a pole mount that includes a gimbal at the top of the pole mount, wherein the 3D measuring device is attached to the gimbal. The support apparatus further includes a counterweight at the bottom of the pole mount, the counterweight matches a weight of the 3D measuring device.

In one or more aspects, the 3D measuring device is a time-of-flight scanner.

In one or more aspects, the 3D measuring device comprises a LIDAR sensor to capture a digital representation of an environment as the 3D measuring system is transported in the environment.

In one or more aspects, the 3D measuring device continuously transmits a captured data to a computing system as the 3D measuring device is moved in an environment.

In one or more aspects, the computing system generates a 3D point cloud representing the environment based on the captured data and stores the 3D point cloud.

In one or more aspects, the 3D measuring device is configured for wireless communication with the computing system.

In one or more aspects, the computing system generates a 2D projection as live feedback of a movement of the 3D measuring device.

In one or more aspects, the 2D projection is displayed on a computing device, separate from the 3D measuring device.

In one or more aspects, the computing device is handheld by an operator.

In one or more aspects, the 2D projection is displayed at a first map tile level, and in response to zooming into a portion of the 2D projection, a second map tile level is displayed.

In one or more aspects, wherein the pole mount is coupled to a body mount that is worn by an operator.

In one or more aspects, the body mount comprises one or more straps for the operator to wear the body mount.

In one or more aspects, the one or more straps are adjustable.

In one or more aspects, the pole mount is coupled to the body mount via a mechanical arm.

In one or more aspects, the mechanical arm can extend using at least two joints.

In one or more aspects, the pole mount is coupled to a moveable platform.

In one or more aspects, the moveable platform is moved manually, autonomously, or semi-autonomously.

In one or more aspects, the counterweight at the bottom of the pole mount comprises one or more accessories of the 3D measuring system.

In one or more aspects, the 3D measuring system comprises a power source for the 3D measuring device.

In one or more aspects, the pole mount is hollow and one or more wires are routed to the 3D measuring device through the pole mount.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
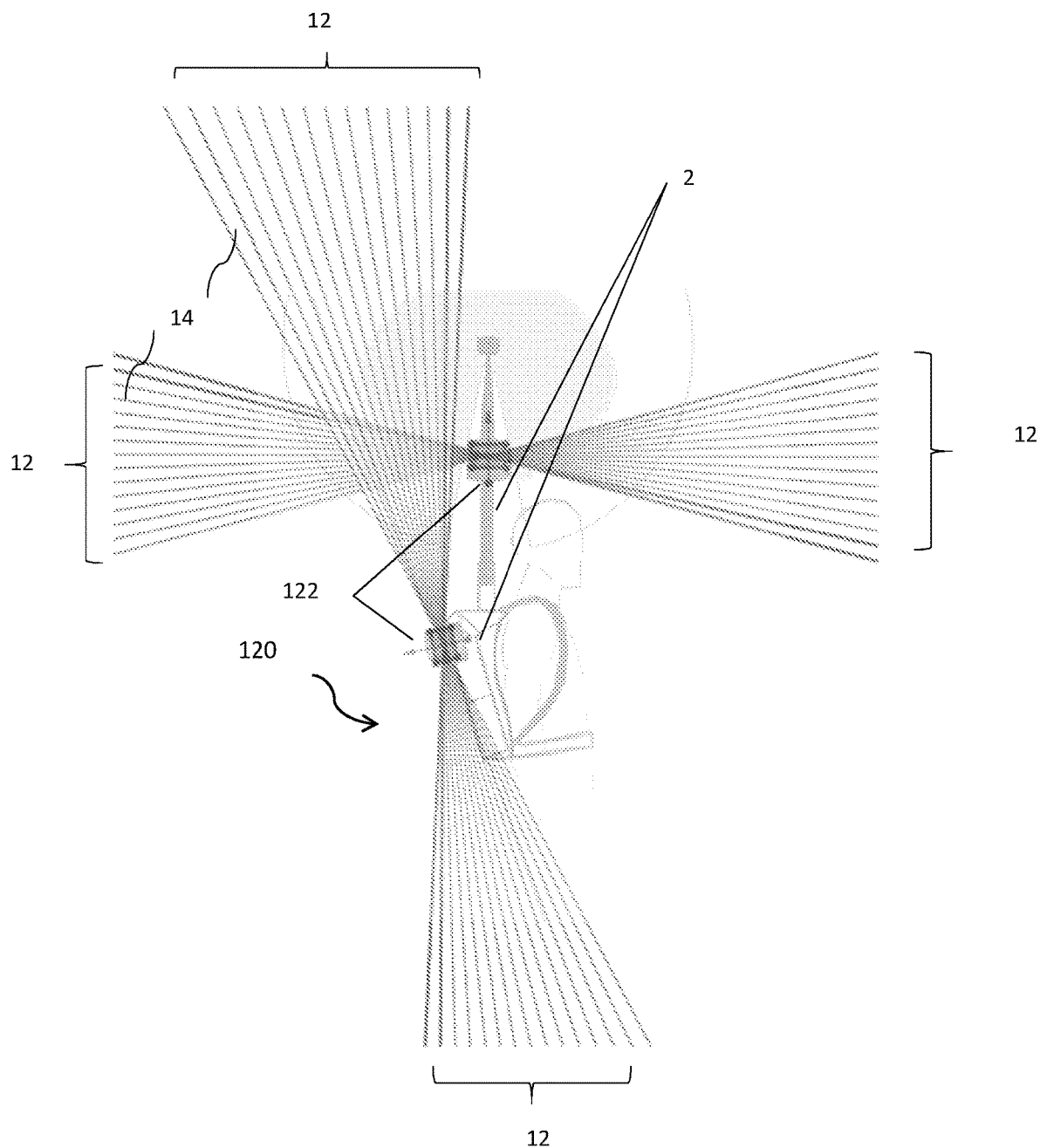
FIG. 1 depicts an example 3D scanning apparatus according to one or more aspects.

The detailed description explains embodiments of the invention, together with advantages and features, by way of example with reference to the drawings.

DETAILED DESCRIPTION

Aspects of the technical solutions described herein provide a system, a device, or an apparatus that includes a mobile 3D scanner that can include one or more sensors, such as LIDAR. The sensors can be off-the-shelf components, for example, LIDAR devices manufactured by VELODYNE® or any other manufacturer. The 3D scanner uses the sensors to capture a surrounding environment's digital three-dimensional (3D) representation. In one or more aspects, the 3D scanner can be carried, for example, as a handheld device that facilitates measuring, capturing, and storing the 3D representation of the surrounding environment. In other aspects, the 3D scanner can be carried, for example, mounted to an autonomous/semi-autonomous moveable platform/vehicle, such as a robot, a vehicle, etc.

It should be noted that the "portability" or the "mobility" of the 3D scanner facilitates continuously capturing the digital representation of the surrounding environment as the 3D scanner is moved in an environment (for example, as the operator walks, vehicle drives, etc.). Instead, in existing solutions, the 3D scanner would be placed at a first position in the environment to capture a first portion of the surrounding environment, then moved to a second position in the environment to capture a second portion, and so on. The two or more digital representations captured from the respective positions, are then registered with each other to generate a map of the surrounding environment in the existing solutions.

By facilitating continuous capturing of the surrounding, the technical solutions described herein improve the speed at which the map (i.e., the 3D digital representation) is generated. For example, the time and effort required to move and place the 3D scanner from one position to another are reduced. Further, the continuous capturing reduces skipped or uncaptured areas because the 3D scanner could not be placed at a suitable position to capture an area. For example, areas behind an obstacle (e.g., column, wall, etc.), inside a cabinet/closet, maybe unreachable for stationary 3D scanners because of limited positions where a tripod or fixture can be placed.

The portability/mobility of the 3D scanner, as opposed to capturing the digital representation when the 3D scanner is stationary introduces several technical challenges. An example technical challenge is the stabilization or support of the 3D scanner while being moved. Without stabilization, the captured digital representation can not only be inaccurate but also blur or smear the data.

Further, for handheld operation (i.e., 3D scanner being carried manually), the weight of the 3D scanner can exceed a desired predetermined weight threshold (e.g., 3 Lbs., 5 Lbs., etc.). The weight can cause an operator to be uncomfortable when carrying the 3D scanner around the environment for extended periods of time (e.g., 15 minutes, 20 minutes, etc.). Some existing solutions to reduce the weight of the 3D scanner, reduce capabilities, e.g., reducing sensors, battery capacity, etc. Other existing solutions, instead of reducing the weight, provide a body-mounted backpack, or other contraption, that the operator can "wear" and which supports the 3D scanner. However, such body-mounted vests are clumsy and inflexible. For example, the body-mounted contraption cannot be used to move the 3D scanner into certain areas where the user cannot reach, such as areas smaller than the operator (e.g., inside a cabinet, around a column, etc.).

The technical solutions described herein address such portability-related technical challenges associated with a 3D scanner. The technical solutions described herein facilitate live scanning and mobile mapping using a 3D scanner by providing a support system with a three-axis gimbal at its center of gravity. Further, the technical solutions described herein isolate the 3D scanner from disturbances, tremors, shaking, or other such movements caused because of the 3D scanner being moved continuously during the scanning by the operator, platform, or a combination thereof. Further, the technical solutions described herein improve inertial stability and reduce a human operator's fatigue by distributing the weight of the 3D scanner away from the operator. For example, a body-mounted vest can be used to attach the technical solutions herein to distribute the weight of the 3D scanner. In addition, a neutral counterbalance is provided by the technical solutions described herein, using one or more components that are used by the 3D scanner, such as a battery or other accessories of the 3D scanner.

The technical solutions described herein provide a practical application by moving the weight away from the hands of the operator. Technical solutions herein further stabilize the 3D scanner to improve the data captured by the 3D scanner while being transported in the environment. In addition, the technical solutions described herein extend the reach and agility of the 3D scanner. Accordingly, stabilized operations can include unrestricted and intuitive angular control of the 3D scanner and large lateral and vertical displacements from the operator's position.

FIG. 1 depicts an example 3D scanning apparatus according to one or more aspects. In the depicted example, an operator carries a 3D scanning apparatus 120, which includes two sensors 122. The sensors 122 are LIDAR devices in the depicted example; however, the sensors 122 can be any other TOF type of sensor. The sensor 122, such as a LIDAR device, facilitates determining the distance (ranges) of a point of an object in the sensor's field of view (FOV) by targeting the object with a light pulse (e.g., laser) and measuring the time for the reflected light to return to a receiver. The sensor 122 facilitates emitting and receiving the light pulses and measuring the time between emission and reception.

The sensors 122 can be mounted on supporting mounts 2 in some examples. The mounting and positioning of the sensors with respect to the operator and/or each other can be different from that shown in the example of FIG. 1. Each sensor 122 has a respective FOV 12. In an embodiment, the at least two sensors 122 facilitate capturing complete (360 degrees) surroundings of the operator. It should be noted that although an operator is depicted to be carrying the measurement device 120 manually (on the back/hand) in FIG. 1, in other examples, the measurement device 120 can be carried by the operator in a different manner. Further, in some examples, the measurement device 120 can be carried by a robotic/automated/semi-automated or manually moved platform in other examples.

Figure 2:
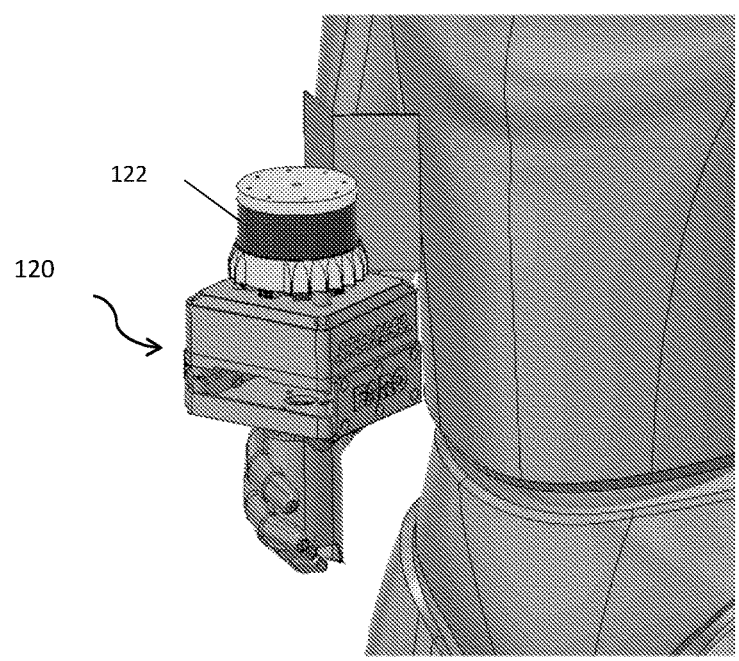
FIG. 2 depicts an example handheld measurement device 120 according to one or more aspects.

FIG. 2 depicts an example handheld measurement device 120 according to one or more aspects. The measurement device 120 operates using the same principles as the other measurement devices described herein, using one or more TOF-type sensors 122. In other examples, the handheld measurement device 120 may be held differently from what is shown in FIG. 2.

Figure 3:
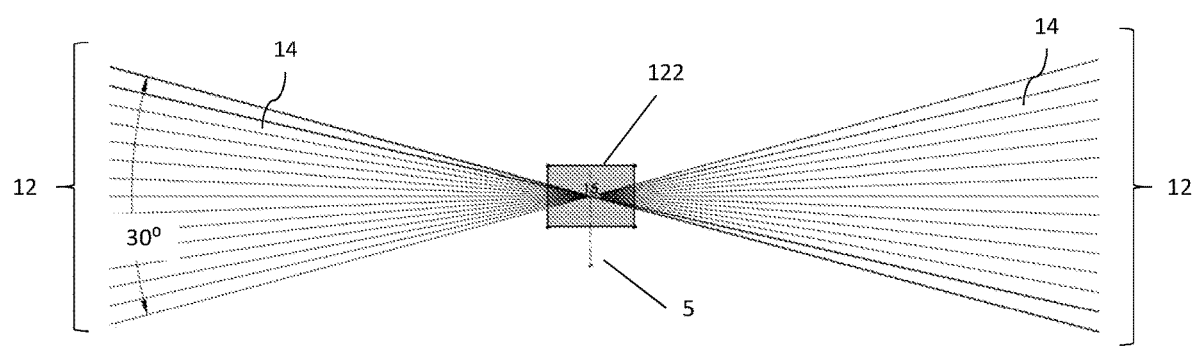
FIG. 3 depicts an example view of the LIDAR sensor according to one or more examples.

FIG. 3 depicts an example view of the LIDAR sensor according to one or more examples. In the depicted example, the sensor 122 is a puck-shaped LIDAR with sixteen scan lines 14 in a 30° vertical FOV 12 with respect to a vertical axis 5 of the sensor 122. It is understood that other types of sensors and/or lidars can be used in other examples with different FOV angles (e.g., 45 degrees) and/or with different resolutions (scan lines per degree/radian).

A technical challenge with using commercially available sensors 122, such as LIDAR devices, is that the FOV 12 is limited to a specific predetermined angle, for example, 30°, in the example of FIG. 3. Hence, to capture the entire volume of a surrounding environment, the operator would have to perform multiple scans with the sensor in different poses (e.g., rotating or angling/tilting the measurement device 120).

Existing solutions attempt to address this technical challenge by using two or more sensors (of the same type) mounted at respective orientations to capture the entire surrounding in fewer scans. However, a technical challenge exists to calibrate the multiple sensors and optimize the respective FOVs to capture the desired portion of the surrounding environment by a measurement device 120. Further, the use of multiple sensors can lead to increased amounts of data being captured by the 3D scanner, which can demand additional computing resources and power to generate the 3D representation. The multiple sensors can also increase the power consumption, size, and cost of the 3D scanner.

Aspects of the technical solutions address the technical challenge and need to capture a location in 3D as fast as possible. Scanning with existing 3D scanning systems can take a long time. A cause for such delay is that multiple stationary scans have to be taken, which are then "registered" using overlapping portions. Presently available solutions typically use landmarks (artificial or natural) to recognize the overlap for such registration. Further, current 3D scanning systems are fixed to a floor/level and cannot be easily used for capturing environments/situations in which multiple levels/floors (e.g., an office building, multistory house, etc.).

As used herein, unless explicitly indicated otherwise, "mobile mapping" is the process of measuring and collecting geospatial data by a mobile 3D scanning system. The 3D scanning system, according to one or more aspects of the technical solutions described herein, can use a backpack, a trolley, a handheld device, an autonomous robot, or any other mobile form. The 3D scanning system uses remote sensing systems like LIDAR cameras in combination with inertial and navigation sensors, e.g., an inertial measurement unit (IMU), for mobile mapping. Further, as used herein, unless explicitly indicated otherwise, simultaneous localization and mapping (SLAM) is a technique/algorithm that a mobile 3D scanning system uses to incrementally build a map of the surrounding environment while the 3D scanning system is moving or has been moved, simultaneously localizing itself on the map. A "map" is a 2D or 3D representation of the environment seen through the various sensors of the 3D scanning system. In an embodiment, the map is represented internally as a grid map. The grid map is a 2D or 3D arranged collection of cells representing an area of the environment. The grid map stores, for every cell, a probability indicating if the cell area is occupied or not based on the measurement(s) from the 3D scanning system. In some examples, the 3D scanning system can include LIDAR sensors which produce a 3D point cloud as output. Technical solutions are not restricted or limited to specific LIDAR sensors and can include LIDAR sensors from VELODYNE®, OUSTER®, or any other manufacturer.

Figure 4:
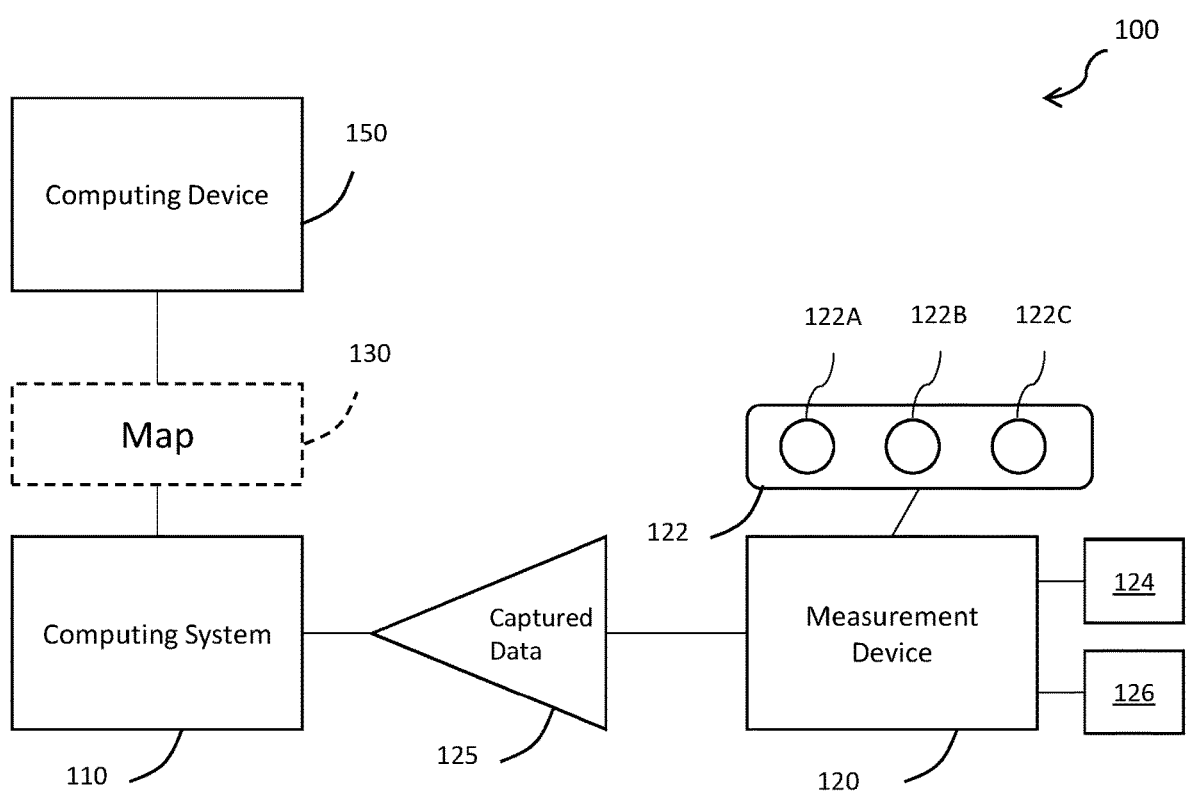
FIG. 4 depicts a scanning system for capturing measurements in an environment according to one or more aspects.

FIG. 4 depicts a scanning system for capturing measurements in an environment according to one or more aspects. The scanning system 100 includes a computing system 110 coupled with a measurement device 120. The coupling facilitates electronic communication of data and instructions between the computing system 110 and the measurement device 120. The communication can be performed in a wired or wireless manner. The measurement device 120 can be a 3D scanner. The computing system 110 can be a computer server or any other type of computing device that facilitates remote storage and processing of the captured data 125.

The captured data 125 from the measurement device 120 includes measurements of a portion of the environment. The captured data 125 is transmitted to the computing system 110 for processing and/or storage. The computing device 110 can store the captured data 125 locally, i.e., in a storage device in the computing device 110 itself, or remotely, i.e., in a storage device that is part of another computing device 150. The computing device 150 can be a computer server or any other type of computing device that facilitates remote storage and processing of the captured data 125.

The captured data 125 from the measurement device 120 can include 2D images, 3D point clouds, a distance of each point in the point cloud(s) from the measurement device 120, color information at each point, radiance information at each point, and other such sensor data captured by the set of sensors 122 of the measurement device 120. For example, sensors 122 can include a LIDAR 122A, a depth camera 122B, a camera 122C, etc. In some cases, the 2D images can be panorama images (e.g., wide-angle images, ultra-wide-angle images, etc.). The measurement device 120 can also include an inertial measurement unit (IMU) 126 to keep track of a pose, including a 3D orientation, of the measurement device 120. Alternatively, or in addition, for the captured data 125, the pose can be extrapolated by using the sensor data from sensors 122, the IMU 126, and/or from sensors besides the range finders.

In one or more aspects, the measurement device 120 can also include a global positioning sensor (GPS) (not shown) or another such location-sensing module that facilitates identifying a global position of the measurement device 120. While there are solutions that use photogrammetry using GPS information, for example, for scaling, such techniques have significant errors (~5-10%) because of the errors in the kinematic GPS measurement. While such techniques may be suitable for generating maps of large spaces (e.g., 5 square miles+) where lower accuracy can be compensated, such errors are not acceptable when generating a map of a relatively smaller area (e.g., an office building, a factory, an industrial floor, a shopping mall, a construction site, etc.).

It should be noted that while only a single measurement device 120 is depicted, in some aspects, multiple measurement devices 120 can transmit respective captured data 125 to the computing system 110. Each of the measurement devices 120 transmits captured data 125 to the computing system 110 concurrently in some aspects.

To address the technical challenges with existing 3D scanning systems and to facilitate capturing a map 130 of the surrounding in real-time using the mobile measurement device 120, aspects of the technical solutions described herein use distributed processing. The distributed processing comprises running a subset of the operations for generating the map 130 on the measurement devices 120 and another subset of the operations on the computing system 110 (i.e., cloud platform), which can process data from the different measurement devices 120. Accordingly, the technical challenge of the limited processing power available at the measurement devices 120 (for example, necessitated by the portability) can be overcome. Further, the distributed processing facilitates updating the computing system 110 (for example, to correct errors, add features, etc.) faster than updating the (local) measurement devices 120.

Figure 5:
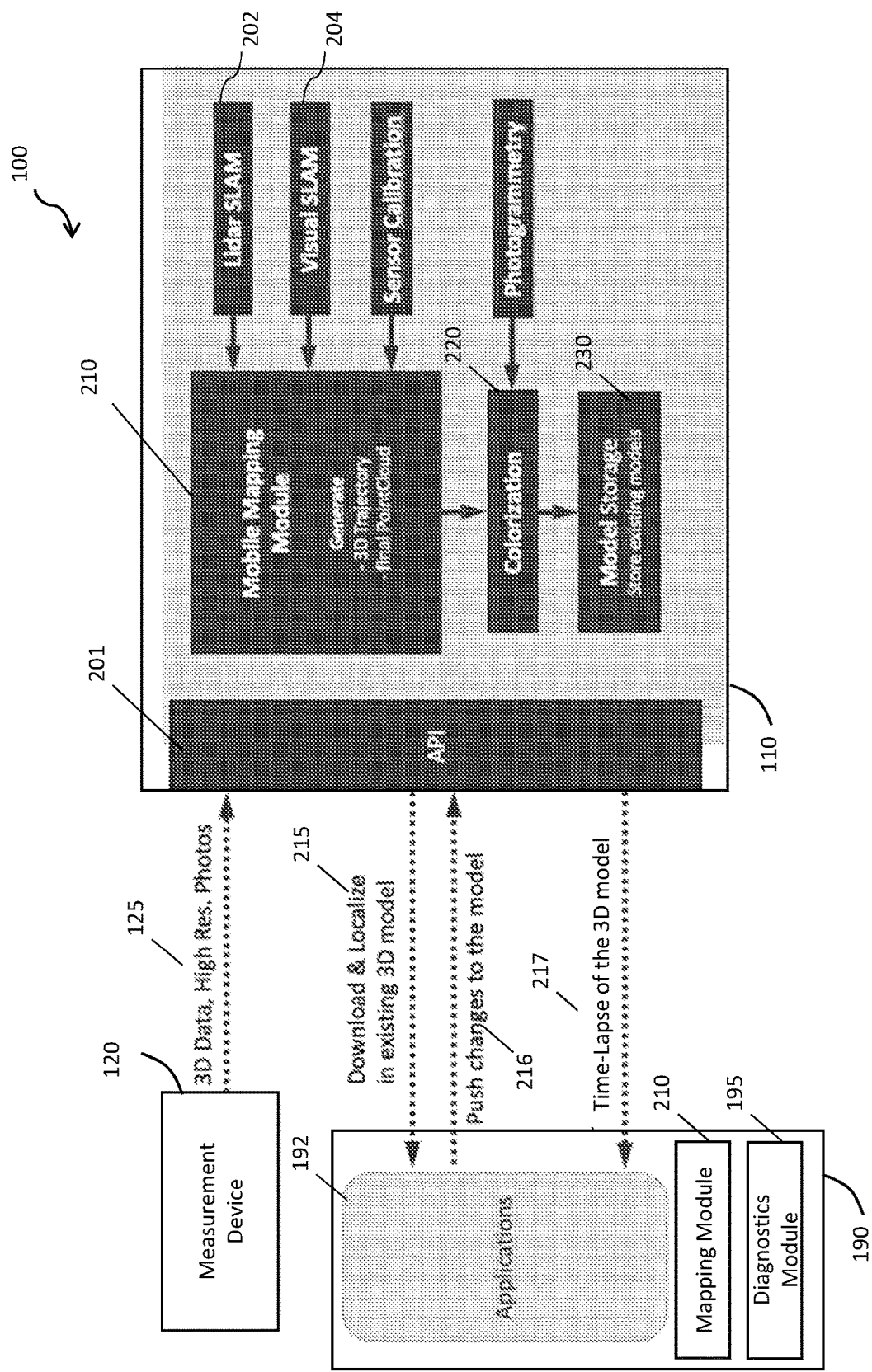
FIG. 5 depicts a block diagram of a structure of the distributed processing performed by the scanning system to generate a map according to one or more aspects.

FIG. 5 depicts a block diagram of a structure of the distributed processing performed by the scanning system 100 to generate map 130 according to one or more aspects. The measurement device 120 transmits the captured data 125 to the computing system 110, i.e., a "cloud computing system." The computing system 110 processes the captured data 125 to generate an output 215. The output 215 includes at least a portion of the map 130.

In some aspects, one or more applications 192 receive the output 215. The one or more applications 190 can be software or computer programs in some aspects. The applications 192 may be executing on a computing device 190. The computing device 190 can be different from the computing system 110 in some aspects. For example, the computing device 190 can be a mobile phone, a tablet computer, a laptop computer, or any other type of portable computing device that may have limited computing resources. The computing device 190 communicates with the computing system 110 in a wired or wireless manner, for example, using a computer network, such as the Internet. In other aspects, the computing device 190 is the computing system 110 itself, or part of the computing system 110. In some examples, the computing device 190 can be the measurement device 120 itself or associated with the measurement device 120.

The computing device 190, in some aspects, can transmit to the computing system 190, one or more requests 216 to change one or more portions of the map 130. The changes can be based on, for example, localization of a portion of the map 130 included in the output 215, resulting in misalignment.

The computing system 110 can provide an application programming interface (API) 201 to facilitate communication with external components such as the measurement device 120 and the computing device 190. The API 201 can be accessed by the external components to provide the captured data 215, the requests 216, and to receive the output 215, the time-lapse of the 3D model 217, and other communications. Predetermined communication protocols and data structures are used to communicate the electronic data between the computing system 110 and the measurement device 120, and the computing device 190. For example, standards associated with the robot operating system (ROS) can be used for transferring the data using *.BAG file protocols. Other types of predetermined data standards can be used in other examples, and the data structures and protocols used for the communication do not limit the technical solutions described herein.

Based on the received inputs (e.g., captured data 125, requests 216, etc.), one or more components of the computing system 110 process the captured data 125. It should be understood that while one possible division of the components of the computing system 110 is depicted, in other aspects of the technical solutions, the components can be structured any other way. The computing system 110 can include a mapping module 210 that generates a trajectory of the measurement device 120 in the map 130 based on the captured data 125. The mapping module 210 can also be responsible for generating a point cloud representing the surrounding environment. In some examples, the point cloud is part of the map 130.

Figure 6:
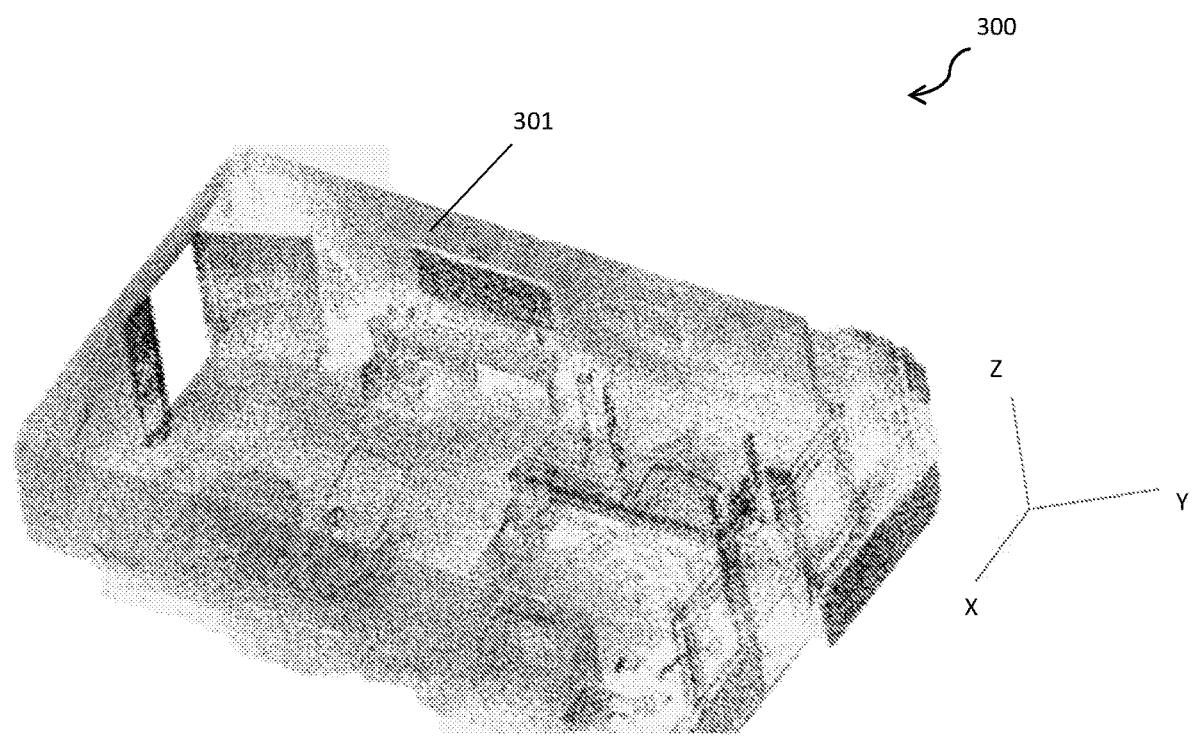
FIG. 6 depicts an example point cloud.

FIG. 6 depicts an example point cloud. A "point cloud" 300 is a collection of individual 3D data points 301, with each data point 301 having a set coordinate on the X, Y, and Z-axis. A 3D model can be represented by rendering each of the data points 301 in the point cloud 300 together. For example, in the illustrated case, the data compiled to create the point cloud 300 is taken from a room to depict the location of each door, window, and any other object (e.g., bed, rug, etc.) or surface in the room. Depending on the data points 301 captured and the density of the point cloud 300, the clarity (or quality) of details and specific types of features and structures will vary.

Referring to FIG. 5, the mapping module 210 is responsible for executing one or more SLAM algorithms, such as lidar SLAM 202, visual SLAM 204, etc. The mapping module 210 uses the captured data 215. Further, the mapping module 210 uses information about the actual measurement device 120 that captured the data, i.e., which sensors were used, calibrations, etc. With such information, the mapping module 210 performs mapping for the different types of sensors 122, i.e., lidars, cameras, IMUs 126, etc. The "mapping" includes aligning the measurements from the several sensors into a homogenous coordinate system as well as ensuring timestamp synchronization across the sensors. The mapping module 210 generates a 3D point cloud 300 in this manner.

The computing system 110 further includes a colorization module 220, which in some aspects colorizes the 3D point cloud 300 that is generated by the mapping module 210. Colorization includes assigning a color to each data point 301 in the point cloud 300. The colorization can be performed using known techniques such as applying a "texture" using a color image captured by a camera. The color image can be a panoramic or fish-eye image in one or more examples. The color image can be aligned with the 3D point cloud 300 using photogrammetry 222 in one or more examples. Other techniques can also be used to colorize the 3D point cloud 300 in other examples.

The 3D point cloud 300 with and/or without colorization is stored by the computing system 110 in a model storage 230.

The 3D point cloud 300 is provided to the computing device 190 as part of the output 215. In one or more examples, the computing device 190 also includes an instance of the mapping module 210. In some aspects, two different instances of the same mapping module 210 are executed, a first instance on the computing system 110, and a second instance on the computing device 190. The second instance has different (relaxed) settings from the first instance of the mapping module 210. The second instance performs a live mapping of the 3D point clouds in the output(s) 215 generated by the computing system 110. The second instance generates a preview of the map 130 using the outputs from the computing system 110. The generated preview can be 2D or 2.5D map (2.5D means a 2D map with depth information). Alternatively, the preview visualizes the 3D point cloud 300 with a lower predetermined resolution.

Additionally, the computing device 190 includes a diagnostics and logging module 195 that saves information about the settings and calibration of the computing device 190.

Figure 7:
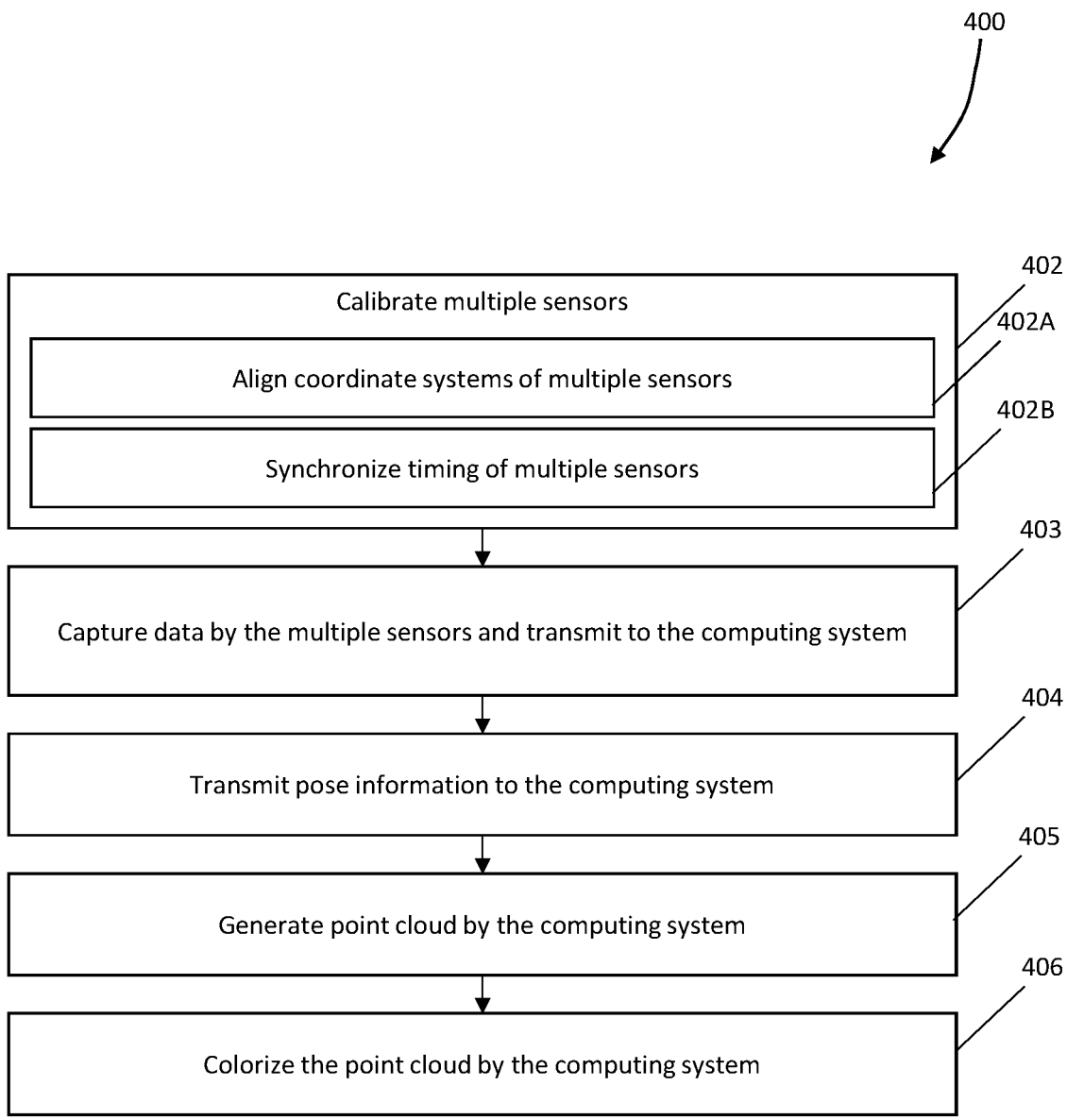
FIG. 7 depicts a flowchart of a method for generating the map of a surrounding environment as the measurement device is transported in the surrounding environment and provides, as feedback, a real-time preview of the map that is being generated according to one or more aspects.

FIG. 7 depicts a flowchart of a method 400 for generating the map 130 of a surrounding environment as the measurement device 120 is transported in the surrounding environment and provides, as feedback, a real-time preview of the map 130 that is being generated according to one or more aspects. The method 400 includes, at block 402, calibrating the sensors 122 of the one or more measurement devices 120. At block 402A, the multiple sensors are calibrated to generate measurements on a single trajectory and a common coordinate system of a point cloud. When multiple sensors are used, the coordinate systems of the multiple sensors have to be aligned to a single common coordinate system. For example, if the measurement device 120 includes two LIDAR sensors, the measurements from both LIDAR sensors are aligned to a common (single) coordinate system. The common coordinate system can be that of one of the two LIDAR sensors or a third coordinate system independent of the two LIDAR sensors.

Figure 8:
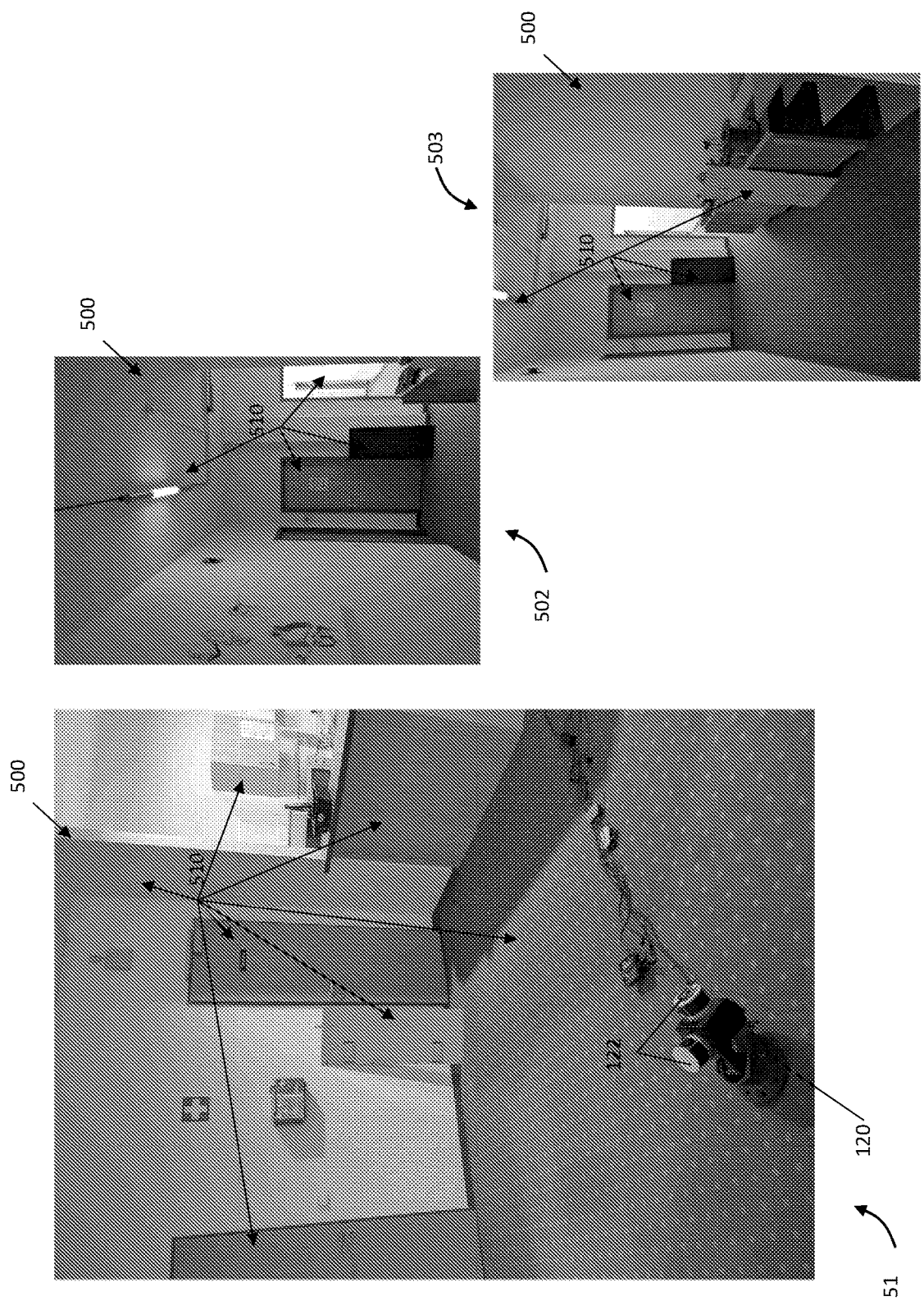
FIG. 8 depicts an example scenario of calibrating two LIDAR sensors.

FIG. 8 depicts an example scenario of calibrating two LIDAR sensors. In the example scenario, a measurement device 120, in this case, a handheld TOF scanner, is placed in an environment 500, in this case, a room. The views 501, 502, 503 depict the measurement device 120 being placed at three different positions in the environment 500 to perform three calibrations. In other aspects, the number of calibrations can be different (fewer/more) than three.

The measurement device 120 has two LIDAR devices 522, in this embodiment. In an embodiment, it is desirable to calibrate the two LIDAR devices 522 to generate a point cloud by fusing the data from the two LIDAR devices 522. It is understood that although only two LIDAR devices 522 are being calibrated in the depicted example, the technical solutions can be used to calibrate several sensors as described herein. Also, it is understood that while VELODYNE® LIDAR devices 522 are depicted, the technical solutions described herein can be used for lidars from other manufacturers and are not limited to specific LIDAR sensors. Further, in some embodiments, the position of the sensors 522 can be different from what is illustrated. The calibration of the two LIDAR devices facilitates aligning the coordinate systems of the two LIDAR sensors 522.

The position of the measurement device 120 for the calibrating in the views 501, 502, 503 facilitates placing multiple surfaces or planes 510 in the field of view of both LIDAR sensors 522. These planes 510 have to be linearly independent to facilitate determining a 6DOF pose of the planes 510 inside the coordinate systems of both LIDAR devices 522. The planes 510 can include any type of plane that can be detected by the sensors, and in this case, the planes 510 include floors, walls, windows, doors, furniture, or any other objects/items that can be detected by the LIDAR devices 522.

The planes 510 extracted from the data captured by the measurement device in this calibration position. The extraction can be performed either manually or automatically. Plane extraction can be performed using computer vision algorithms such as hierarchical plane extraction or the like. The same planes from the two separate data captures from the two LIDAR devices 522 at each calibration position are fitted to each other using known plane fitting techniques. The transformation that has to be applied to fit the first instance of a plane (e.g., a door) that is captured by the first LIDAR device 522 to a second instance of the same plane (i.e., the door) that is captured by the second LIDAR device 522 is used as the calibration transformation for the two LIDAR devices. When there are multiple planes (as in the example), the transformation that fits all of the planes from the two captured datasets is determined and used as the calibration transformation. The optimization problem can be formulated as finding a transformation T such as all planes from one LIDAR sensor L1 transformed by the transformation T are on the same corresponding plane from the other LIDAR sensor L2.

Referring to the flowchart in FIG. 7, calibrating the sensors further includes, at block 402B, synchronizing timing across the multiple sensors 122. Timestamping the captured data from the sensors is crucial for the quality of the mapping. If the timestamps of the sensors are different in relation to each other, the processing places the captured data at positions away from each other. Software-based timestamping of the incoming data is inaccurate and can also depend on the amount of data being processed by the measurement device 120 (system load). Such a technical challenge of synchronizing the sensors is addressed by using a precision clock synchronization protocol for networked measurement and control. In an example protocol, the clocks of two LIDAR devices 522 are synchronized to a grandmaster clock (third independent clock). The protocol supports system-wide synchronization accuracy in the sub-microsecond range with minimal network and local clock computing resources. Other types of timing synchronization can be implemented in other examples.

At block 404, sensor measurements of the surrounding environment are captured by the measurement devices 120 and transmitted to the computing system 110. The measured sensor data is the captured data 125. The sensors usually run at 20 Hz and produce a complete point cloud per sweep. This leads to a large amount of data per sweep. The data has to be transmitted to the computing system 110 for further processing. If the data is too large (multiple megabytes), data transfer can limit the speed at which the map 130 is generated. Accordingly, to address the technical challenge of the amount of data being generated by the sensors, technical solutions described herein only record the raw data of the LIDAR device, which does not contain a 3D point measurement but only distance and angle information. This reduces the amount of data by a factor ~5. Furthermore, to reduce the transfer time of the data to the computing system 110 an external storage device (not shown) is plugged into the measurement device 120 where the captured data is stored. In some aspects, for transferring the captured data to the computing system, the external storage is plugged and read into the computing system 110. Alternatively, or in addition, the data that is stored in the external storage is uploaded to the computing system 110 via WIFI®, 4G/5G, or any other type of communication network.

At block 406, the measurement device 120 transmits pose-information of the measurement device 120 to the computing system. At block 408, the mapping module 210 of the computing system 120 performs mapping to generate a 3D point cloud 300 of the surrounding using the captured data 125, calibration data, and pose information based on one or more SLAM algorithms. Further, at block 410, the 3D point cloud 300 may be colorized.

Figure 9:
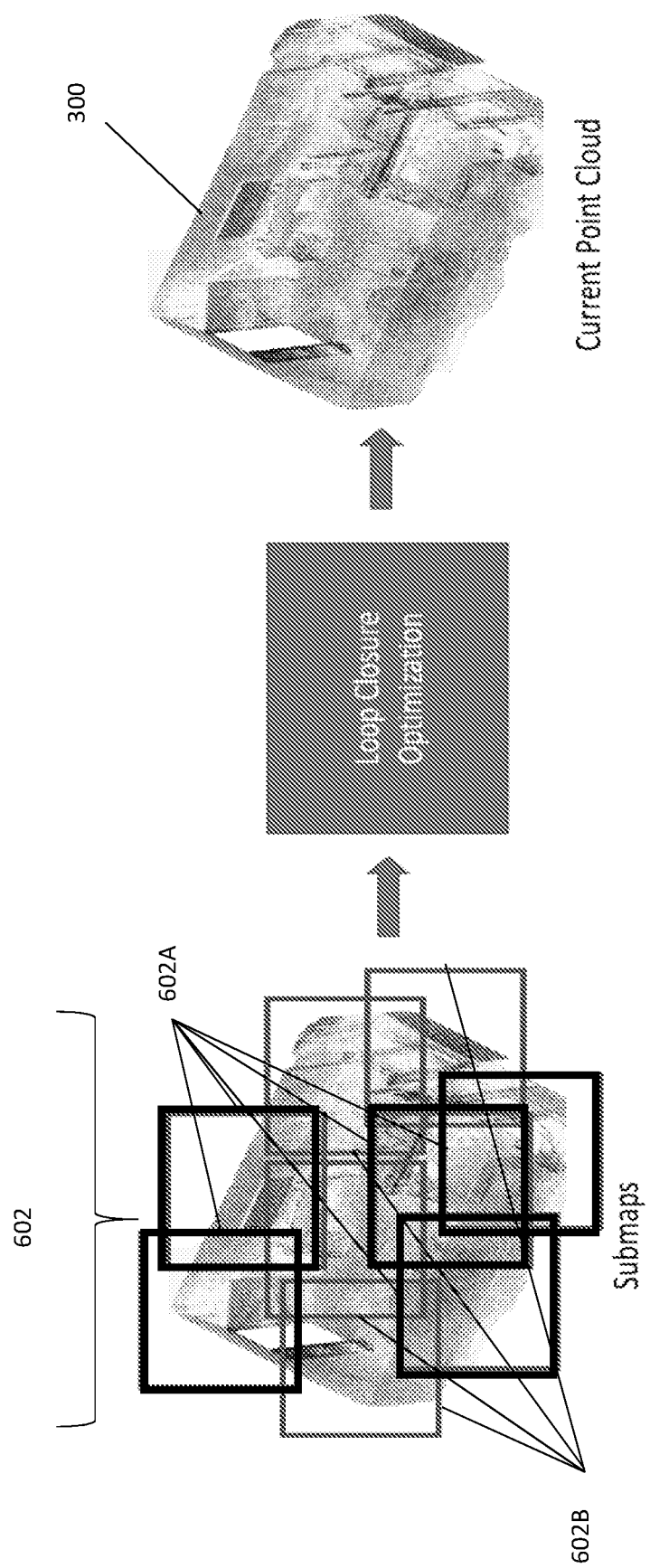
FIG. 9 depicts point cloud generation according to one or more aspects of the technical solutions described herein.

FIG. 9 depicts point cloud generation according to one or more aspects of the technical solutions described herein. In the point cloud generation in FIG. 9, the mapping module 210 uses the graph SLAM algorithm in which the recorded and registered point clouds generated by the LIDAR devices 522 are grouped together in submaps 602. The submaps 602 can be freely moved by the SLAM algorithm in the process of global optimization to find loop closures and reduce the systematic drift over time. For every single timepoint, the point cloud 300 can be generated by merging all of the submap point clouds 602 together. The submaps 602 represent the captured data 125 that is received from the measurement device 120, i.e., the LIDAR devices 522, over time. The submaps 602 can include a first subset of submaps (e.g., submaps 602A) received from the first LIDAR device and a second subset of submaps (e.g., submaps 602B) received from the second LIDAR device.

The 3D point cloud 300 is stored in the model storage 230, at block 412. The storage can include updating the map 300 of the surrounding environment 500 that is stored in the model storage 230 by appending the 3D point cloud 300 in the stored map 300.

As noted, the technical solutions herein further provide user confidence that areas s/he is mapping lead to a usable point cloud by providing real-time feedback and preview of the map 300 that is being generated by the computing system 110. Existing scanning systems may not give any feedback during scanning, and after all the processing is completed, users can notice parts of the point cloud that are misaligned. This can cause the user to capture all or at least a portion of the data again, which can be resource and time-intensive. In some cases, the user may have already left the premises of the environment that was to be captured, making the corrections even more challenging. Further, rendering a full 3D point cloud 300 for display is computationally intensive and unintuitive for many user workflows (e.g., navigation in a point cloud on a mobile touch device is not user-friendly).

Figure 10:
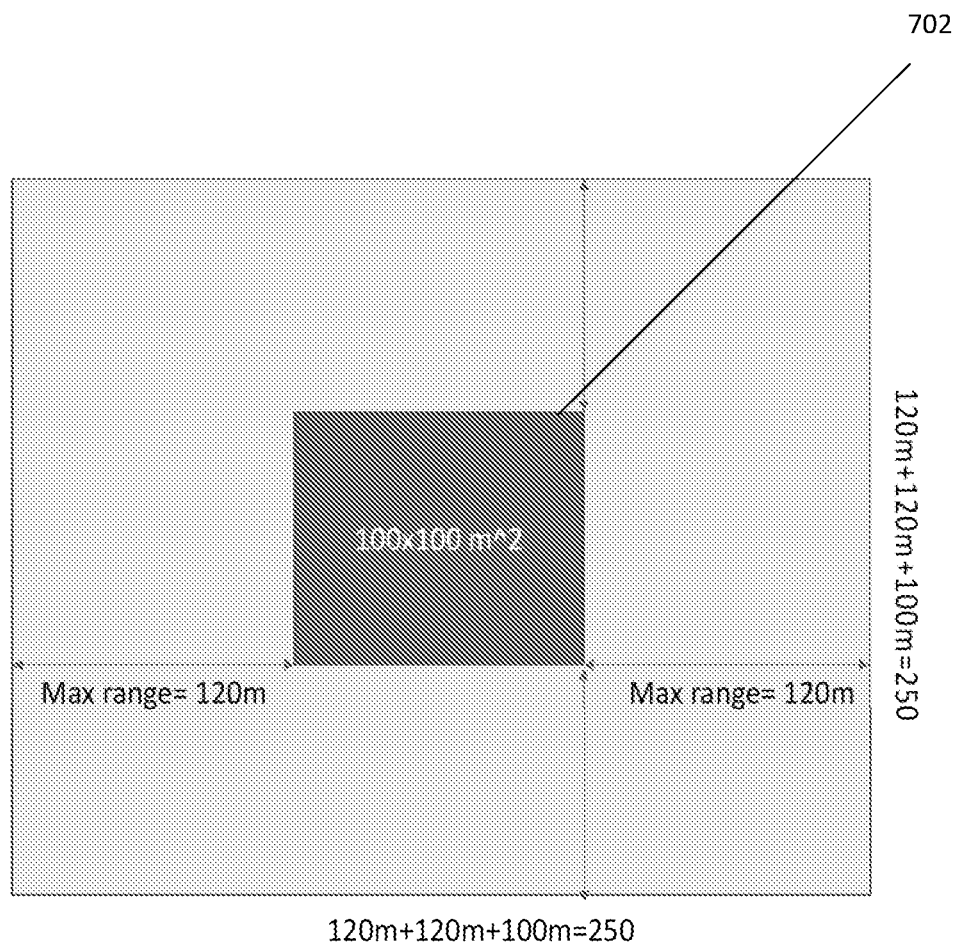
FIG. 10 depicts a 2D image that is generated by the projection according to one or more examples.

Accordingly, at block 414, a 2D visualization is generated for providing "live" (i.e., real-time) feedback that is responsive as the user moves the measurement device 122 in the surrounding environment. The 2D visualization is generated by the computing system 110 and output to the computing device 190 in some aspects. For the generation of the live feedback, the submaps 602 are used to project a representation of the point cloud 300 onto a 2D plane, resulting in a 2D image that can be shown for the 2D visualization. The 2D image that is generated can be large. FIG. 10 depicts a 2D image 702 that is generated by the projection according to one or more examples. In the example, consider mapping an outdoor area with a LIDAR range set to 120 m. In such a case, the measurement device 120 generates the map 130 with a resolution of 5 cm per grid. Accordingly, for a 10000 $m^2$ area that is scanned by the measurement device 120, the 2D image 702 that is projected can have a size of up to (100 m+240 m)*20cells/m*(100 m+240 m)x*20cells/m=6800pixels x 6800pixels=46.24 megapixel). Providing live feedback in real-time when generating the 2D image 702 can be technically challenging for that size. Hence, the 2D projected map is periodically split to generate map tiles in one or more aspects.

Figure 11:
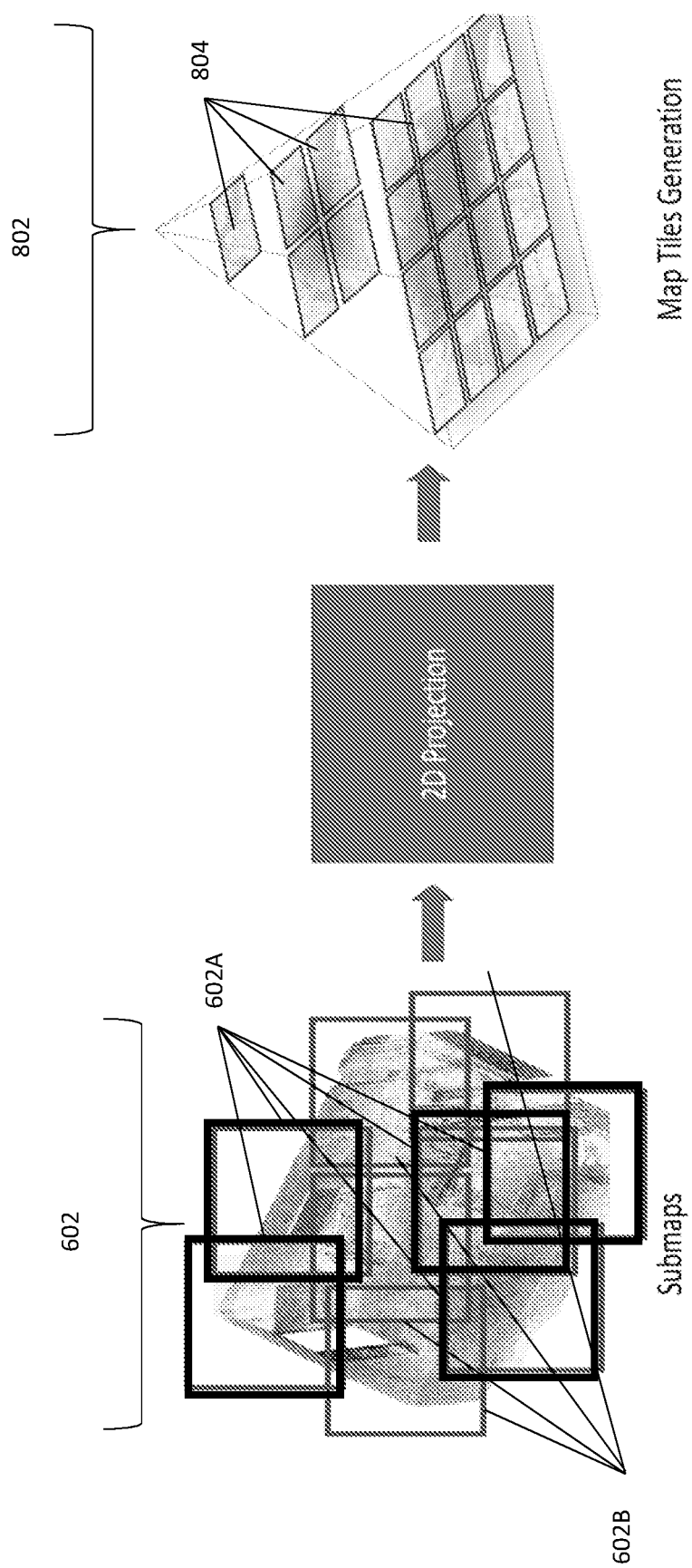
FIG. 11 depicts generating map tiles corresponding to a map according to one or more aspects of the technical solutions herein.

FIG. 11 depicts generating map tiles corresponding to the map 130 according to one or more aspects of the technical solutions herein. The map tiles provide a lower resolution 2D image 802 that is divided into smaller parts called tiles 804. Depending on the zoom level on the computing device 190, the corresponding map tile level is displayed. For example, on the highest zoom level, the computer device 190 displays the lowest resolution map tiles (i.e., least detail). Once the operator zooms into a certain area of the map 130, only map tiles 804 covering that certain area are visualized. This allows a user to see the overall captured environment and also if desired, see the details of specific areas by zooming into the specific areas to be inspected. Map tiles 804 are used in combination with a point cloud 300 that can be composed of billion(s) of data points 301 to facilitate the real-time view of the 2D projection of the point cloud 300. Map tiles 804 are generated using known techniques for visualizing large 3D datasets.

The low latency in the visualization to facilitate the real-time view can be achieved by caching the 2D image 702. In some aspects, once the initial map tiles are generated, the user can immediately navigate/zoom on the overall 2D map 702. Further, if a submap 602 moves in the process of loop closure or if a new submap 602 is added, the 2D image 702 is updated in response. Only the parts of the cached 2D image that belong to the submaps 602 that was moved (in the process of loop closure) or were newly added are updated. Accordingly, the update uses fewer resources than required for updating the entire 2D image 702. Accordingly, the time required for the update is reduced, facilitating real-time feedback.

It should be appreciated that the examples of measurement devices depicted herein can further be attached to an external camera to capture the identity images 310, in addition to any of the cameras that are already associated with the measurement devices.

Terms such as processor, controller, computer, DSP, FPGA are understood in this document to mean a computing device that may be located within an instrument, distributed in multiple elements throughout an instrument, or placed external to an instrument.

In one or more aspects, the captured data 125 can be used to generate a map 130 of the environment in which the measurement device 120 is being moved. The computing device 110 and/or the computing device 150 can generate map 130. Map 130 can be generated by combining several instances of the captured data 125, for example, submaps. Each submap can be generated using SLAM, which includes generating one or more submaps corresponding to one or more portions of the environment. The submaps are generated using the one or more sets of measurements from the sets of sensors 122. The submaps are further combined by the SLAM algorithm to generate map 130.

It should be noted that a "submap" is a representation of a portion of the environment and that map 130 of the environment includes several such submaps "stitched" together. Stitching the maps together includes determining one or more landmarks on each submap that is captured and aligning and registering the submaps with each other to generate map 130. In turn, generating each submap includes combining or stitching one or more sets of captured data 125 from the measurement device 120. Combining two or more captured data 125 requires matching or registering one or more landmarks in the captured data 125 being combined.

Here, a "landmark" is a feature that can be detected in the captured data 125, and which can be used to register a point from a first captured data 125 with a point from a second captured data 125 being combined. For example, the landmark can facilitate registering a 3D point cloud with another 3D point cloud or registering an image with another image. Here, the registration can be done by detecting the same landmark in the two captured data 125 (images, point clouds, etc.) that are to be registered with each other. A landmark can include but is not limited to features such as an edge, a corner, a doorknob, a door, a lamp, a fire extinguisher, or any other such identification mark that is not moved during the scanning of the environment. The landmarks can also include stairs, windows, decorative items (e.g., plants, picture-frames, etc.), furniture, or any other such structural or stationary objects. In addition to such "naturally" occurring features, i.e., features already present in the environment being scanned, landmarks can also include "artificial" landmarks added by the operator of the measurement device 120. Such artificial landmarks can include identification marks reliably captured and used by the measurement device 120. Examples of artificial landmarks can include predetermined markers or targets, such as labels of known dimensions and patterns, e.g., a checkerboard pattern, a target sign, spheres, or other such preconfigured markers.

In the case of some of the measurement devices 120, such as a volume scanner, the computing device 110, 150 can implement SLAM while building the scan to prevent the measurement device 120 from losing track of where it is by virtue of its motion uncertainty because there is no presence of an existing map of the environment (the map is being generated simultaneously). It should be noted that in the case of some types of measurement devices 120, SLAM is not performed. For example, in the case of a laser tracker 20, the captured data 125 from the measurement device 120 is stored without performing SLAM.

It should be noted that although the description of implementing SLAM is provided, other uses of the captured data (2D images and 3D scans) are possible in other aspects of the technical solutions herein.

Figure 12:
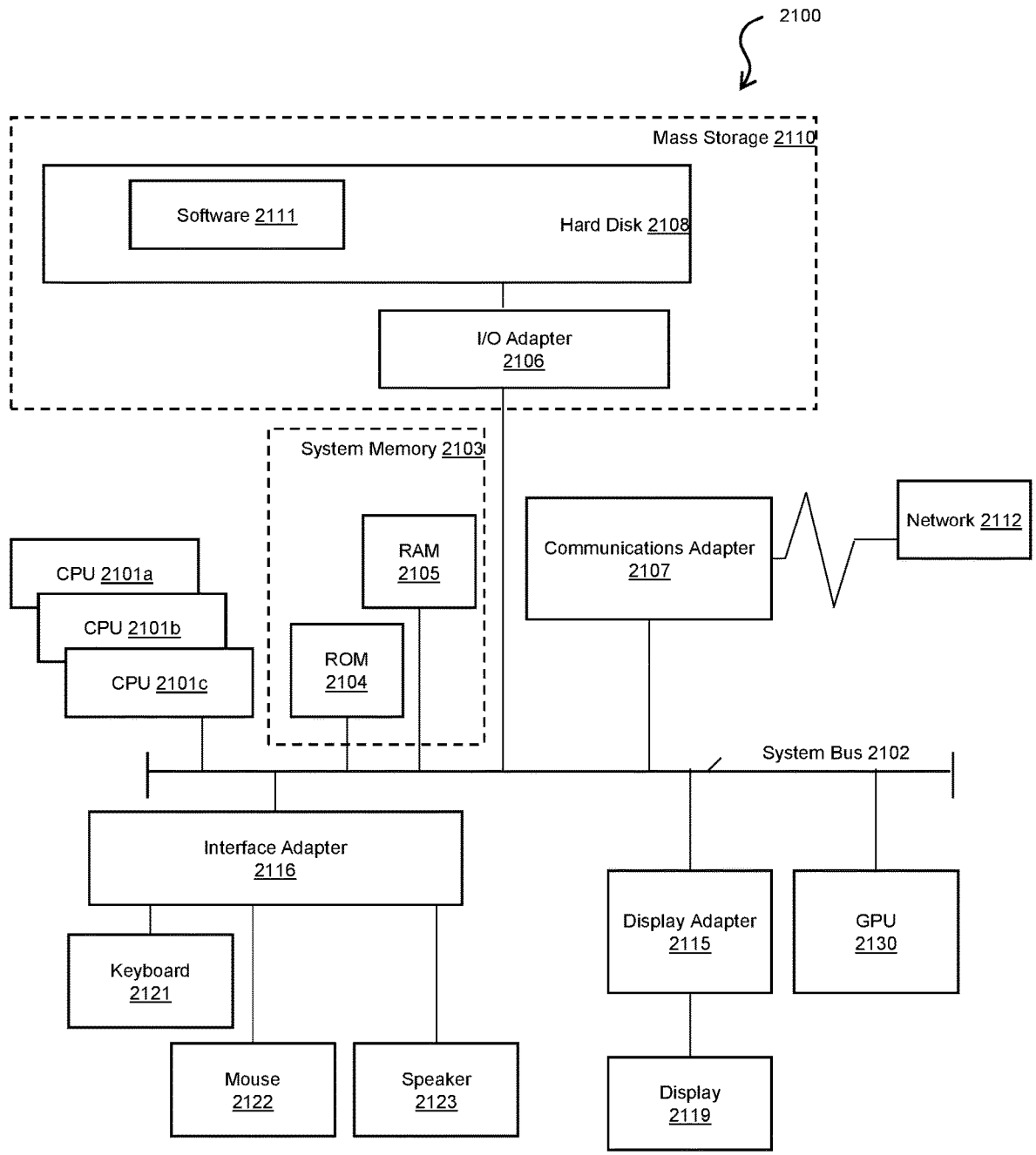
FIG. 12 depicts a computer system that can be used to implement one or more aspects of the technical solutions described herein.

Turning now to FIG. 12, a computer system 2100 is generally shown in accordance with an aspect. The computer system 2100 can be used as the computing device 110 and/or the computing device 150. The computer system 2100 can be an electronic, computer framework comprising and/or employing any number and combination of computing devices and networks utilizing various communication technologies, as described herein. The computer system 2100 can be easily scalable, extensible, and modular, with the ability to change to different services or reconfigure some features independently of others. The computer system 2100 may be, for example, a server, desktop computer, laptop computer, tablet computer, or smartphone. In some examples, computer system 2100 may be a cloud computing node. Computer system 2100 may be described in the general context of computer system executable instructions, such as program modules, being executed by a computer system. Generally, program modules may include routines, programs, objects, components, logic, data structures, and so on that perform particular tasks or implement particular abstract data types. Computer system 2100 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 12, the computer system 2100 has one or more central processing units (CPU(s)) 2101a, 2101b, 2101c, etc. (collectively or generically referred to as processor(s) 2101). The processors 2101 can be a single-core processor, multi-core processor, computing cluster, or any number of other configurations. The processors 2101, also referred to as processing circuits, are coupled via a system bus 2102 to a system memory 2103 and various other components. The system memory 2103 can include a read-only memory (ROM) 2104 and a random access memory (RAM) 2105. The ROM 2104 is coupled to the system bus 2102 and may include a basic input/output system (BIOS), which controls certain basic functions of the computer system 2100. The RAM is read-write memory coupled to the system bus 2102 for use by the processors 2101. The system memory 2103 provides temporary memory space for operations of said instructions during operation. The system memory 2103 can include random access memory (RAM), read-only memory, flash memory, or any other suitable memory system.

The computer system 2100 comprises a graphics processing unit (GPU) 2130 that can include one or more processing cores and memory devices. The GPU can be used as a co-processor by the processors 2101 to perform one or more operations described herein.

The computer system 2100 comprises an input/output (I/O) adapter 2106 and a communications adapter 2107 coupled to the system bus 2102. The I/O adapter 2106 may be a small computer system interface (SCSI) adapter that communicates with a hard disk 2108 and/or any other similar component. The I/O adapter 2106 and the hard disk 2108 are collectively referred to herein as mass storage 2110.

Software 2111 for execution on the computer system 2100 may be stored in the mass storage 2110. The mass storage 2110 is an example of a tangible storage medium readable by the processors 2101, where the software 2111 is stored as instructions for execution by the processors 2101 to cause the computer system 2100 to operate, such as is described hereinbelow with respect to the various Figures. Examples of computer program product and the execution of such instruction is discussed herein in more detail. The communications adapter 2107 interconnects the system bus 2102 with a network 2112, which may be an outside network, enabling the computer system 2100 to communicate with other such systems. In one aspect, a portion of the system memory 2103 and the mass storage 2110 collectively store an operating system, which may be any appropriate operating system to coordinate the functions of the various components shown in FIG. 12.

Additional input/output devices are shown as connected to the system bus 2102 via a display adapter 2115 and an interface adapter 2116. In one aspect, the adapters 2106, 2107, 2115, and 2116 may be connected to one or more I/O buses that are connected to the system bus 2102 via an intermediate bus bridge (not shown). A display 2119 (e.g., a screen or a display monitor) is connected to the system bus 2102 by a display adapter 2115, which may include a graphics controller to improve the performance of graphics-intensive applications and a video controller. A keyboard 2121, a mouse 2122, a speaker 2123, etc., can be interconnected to the system bus 2102 via the interface adapter 2116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 12, the computer system 2100 includes processing capability in the form of the processors 2101, and storage capability including the system memory 2103 and the mass storage 2110, input means such as the keyboard 2121 and the mouse 2122, and output capability including the speaker 2123 and the display 2119.

In some aspects, the communications adapter 2107 can transmit data using any suitable interface or protocol, such as the internet small computer system interface, among others. The network 2112 may be a cellular network, a radio network, a wide area network (WAN), a local area network (LAN), or the Internet, among others. An external computing device may connect to the computer system 2100 through network 2112. In some examples, an external computing device may be an external web server or a cloud computing node.

It is to be understood that the block diagram of FIG. 12 is not intended to indicate that the computer system 2100 is to include all of the components shown in FIG. 8. Rather, the computer system 2100 can include any appropriate fewer or additional components not illustrated in FIG. 12 (e.g., additional memory components, embedded controllers, modules, additional network interfaces, etc.). Further, the aspects described herein with respect to computer system 2100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various aspects.

It will be appreciated that aspects of the present disclosure may be embodied as a system, method, or computer program product and may take the form of a hardware aspect, a software aspect (including firmware, resident software, micro-code, etc.), or a combination thereof. Furthermore, aspects of the present disclosure may take the form of a computer program product embodied in one or more computer-readable medium(s) having computer-readable program code embodied thereon. Methods herein can be computer-implemented methods.

One or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer-readable storage medium may be a tangible medium containing or storing a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

The computer-readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer, and partly on a remote computer, or entirely on the remote computer or server.

Figure 13:
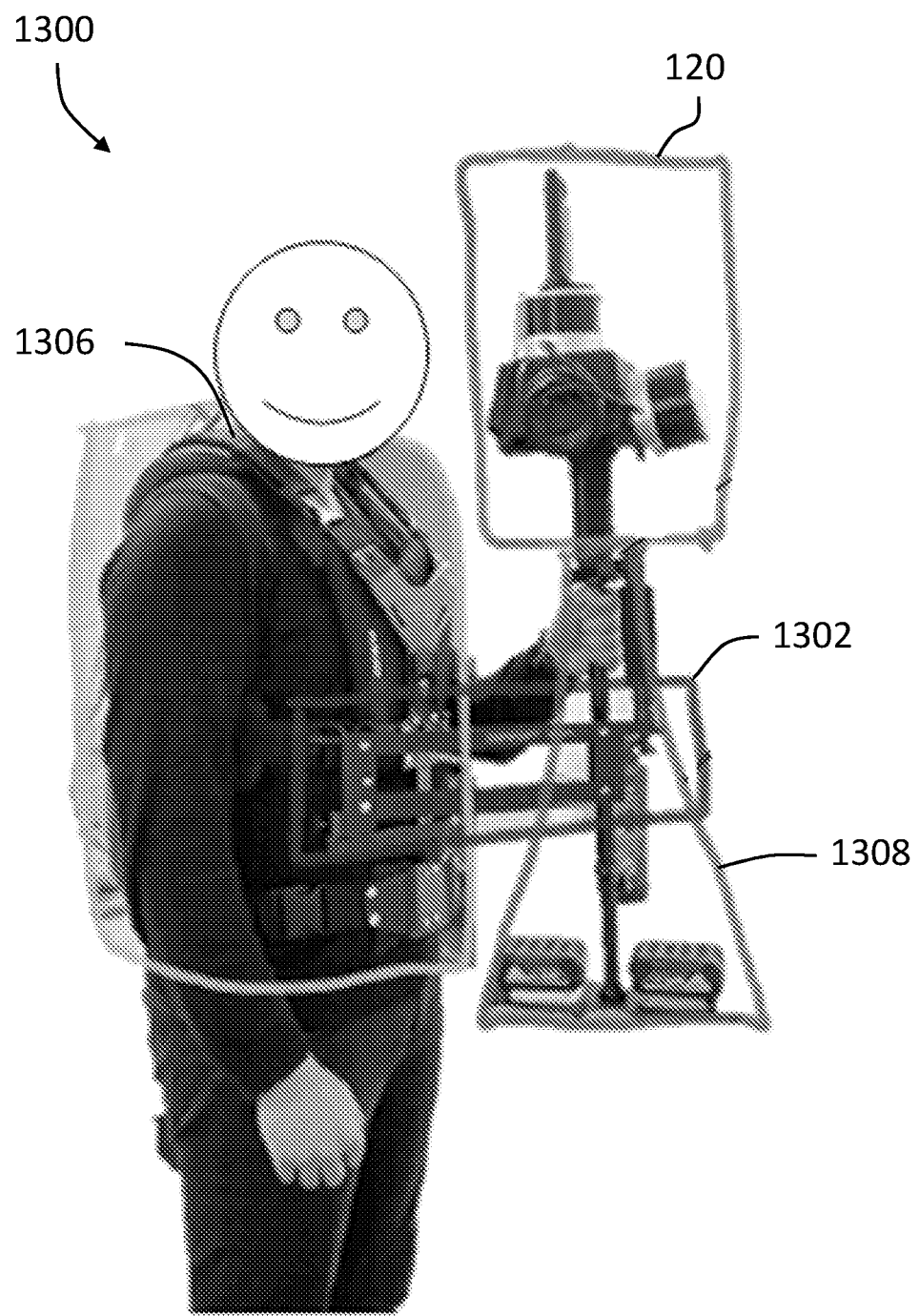
FIG. 13 depicts mounting a 3D scanner for manual transportation according to one or more aspects of the technical solutions described herein.

FIG. 13 depicts mounting the 3D scanner for manual transportation according to one or more aspects of the technical solutions described herein. The technical solutions include a support apparatus 1300 on which the 3D scanner 120 is equipped. The support apparatus 1300 includes a mechanical arm 1302 and a gimbal 1304. In some cases, the support apparatus 1300 also includes a body mount 1306.

Figure 14:
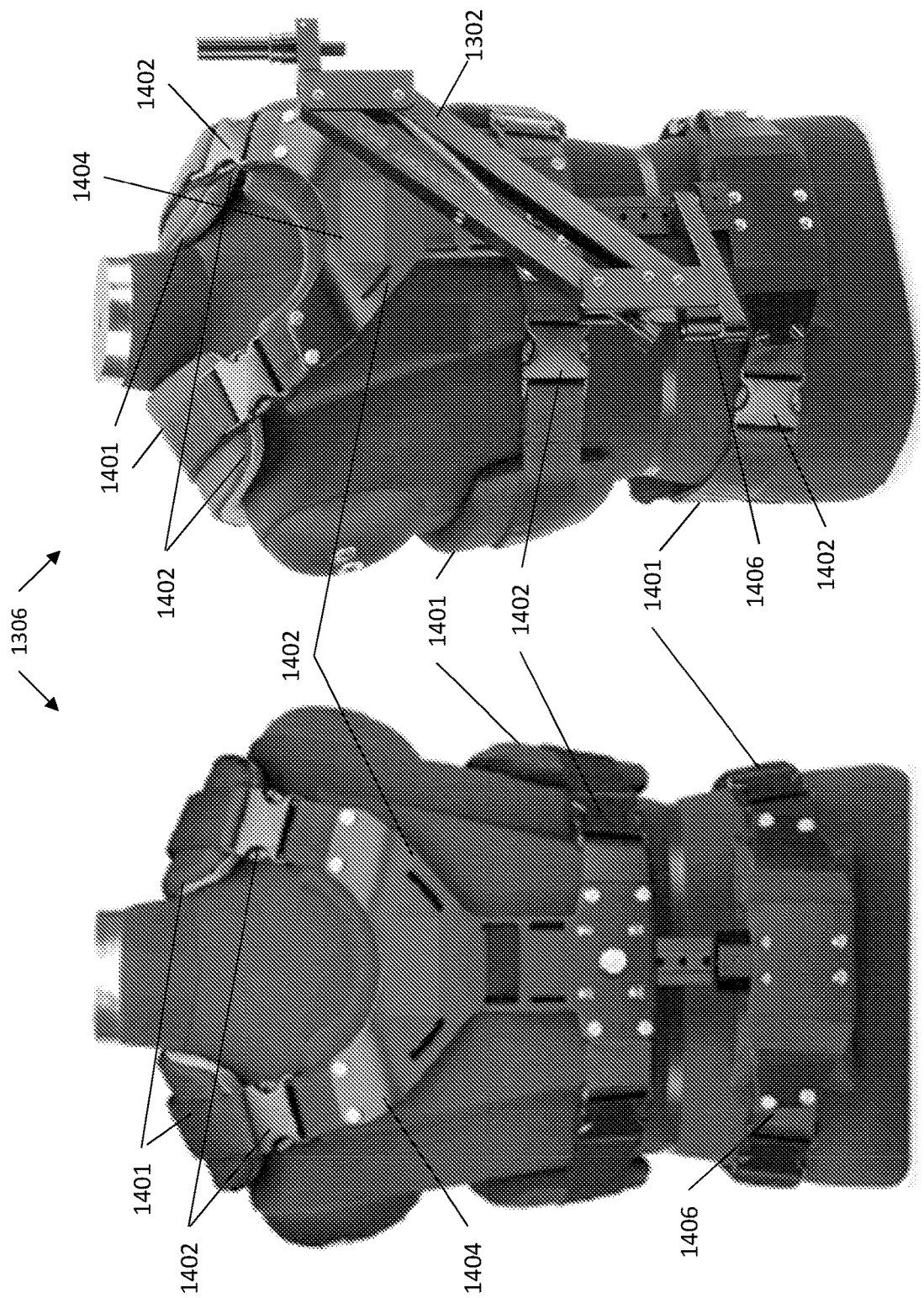
FIG. 14A and FIG. 14B depict views of an example body mount 1306 according to one or more aspects.

FIGS. 14A and 14B depict views of an example body mount 1306 according to one or more aspects. The body mount 1306 illustrated is a "vest" that can be "worn" by an operator. The body mount includes several straps 1401. One or more straps 1401 can be worn over the operator's shoulders. One or more straps 1401 can be worn over the operator's torso, for example, around the chest. One or more straps 1401 can be worn lower around the operator's torso, for example, around the waist. Each strap 1401 can include at least one connector 1402, such as a clip, a buckle, a clasp, a clamp, or any other type of fastener that facilitates the operator to wear the strap 1401. The straps 1401 and clips 1402 can include padding material, such as foam, to prevent discomfort to the user. The length of each strap 1401 is adjustable depending on the operator's comfort, for example, to make the strap 1401 to fit tight or loose.

The body mount 1306 further includes a Y-portion 1404 that is connected to the straps 1401. The Y-portion can be connected to the straps 1401 at predetermined positions using fasteners such as rivets, screws, or other fasteners.

The Y-portion 1404 includes an arm-mount 1406. It is understood that the arm-mount 1406 can be positioned at other points on the body mount 1306, and that the illustrated position of the arm-mount 1406 is one example position. The arm-mount 1406 facilitates mounting the mechanical arm 1302 to the body mount 1306.

Figure 15:
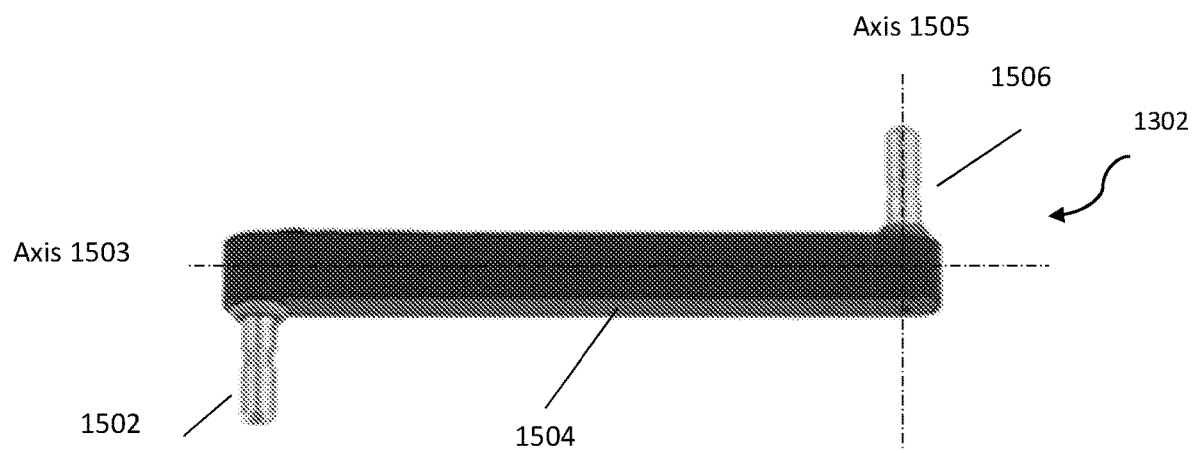
FIG. 15 depicts an example mechanical arm 1302 according to one or more aspects.

FIG. 15 depicts an example mechanical arm 1302 according to one or more aspects. The mechanical arm 1302 includes a coupler 1502 that facilitates equipping the mechanical arm 1302 with the body mount 1306, or any other compatible coupling joint. The coupler 1502 can be a yoke or any other linkage that can connect/couple the mechanical arm 1302 with the arm mount 1406 of the body mount 1306 (or any other component).

The mechanical arm 1302 further includes a shaft 1504, which has the coupler 1502 at one end (body mount end). At the other end of the shaft 1504, is another (second) coupler 1506. In some examples, the two couplers 1502, 1506 of the shaft 1504 are of the same type. In some examples, the couplers 1502 and 1506 extend in opposite directions (opposite each other).

Figure 16:
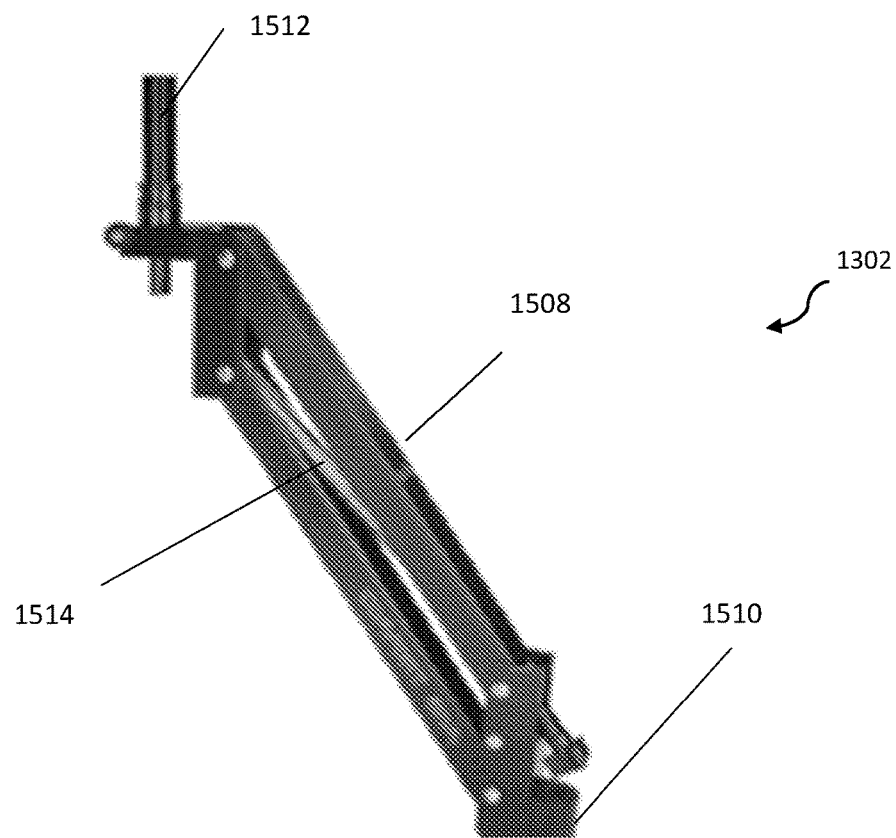
FIG. 16 depicts an extension shaft according to one or more aspects.

In some examples, as shown in FIG. 16, the mechanical arm 1302 includes an extension-shaft 1508. The second coupler 1506 is used to connect the extension-shaft 1508 to the shaft 1504. In some examples, the extension-shaft has a ring 1510 at one (first) end that connects the extension-shaft 1508 with the second coupler 1506 of the shaft 1504. In some examples, the extension-shaft 1508 connects to the shaft 1504 in an orthogonal manner. For example, the coupler 1506 facilitates the extension-shaft 1508 to fit along an axis 1505, which is orthogonal to axis 1503 of the shaft 1504. The coupler 1506 and ring 1510 facilitate the extension-shaft 1508 to be rotated around the axis 1505.

Figure 17:
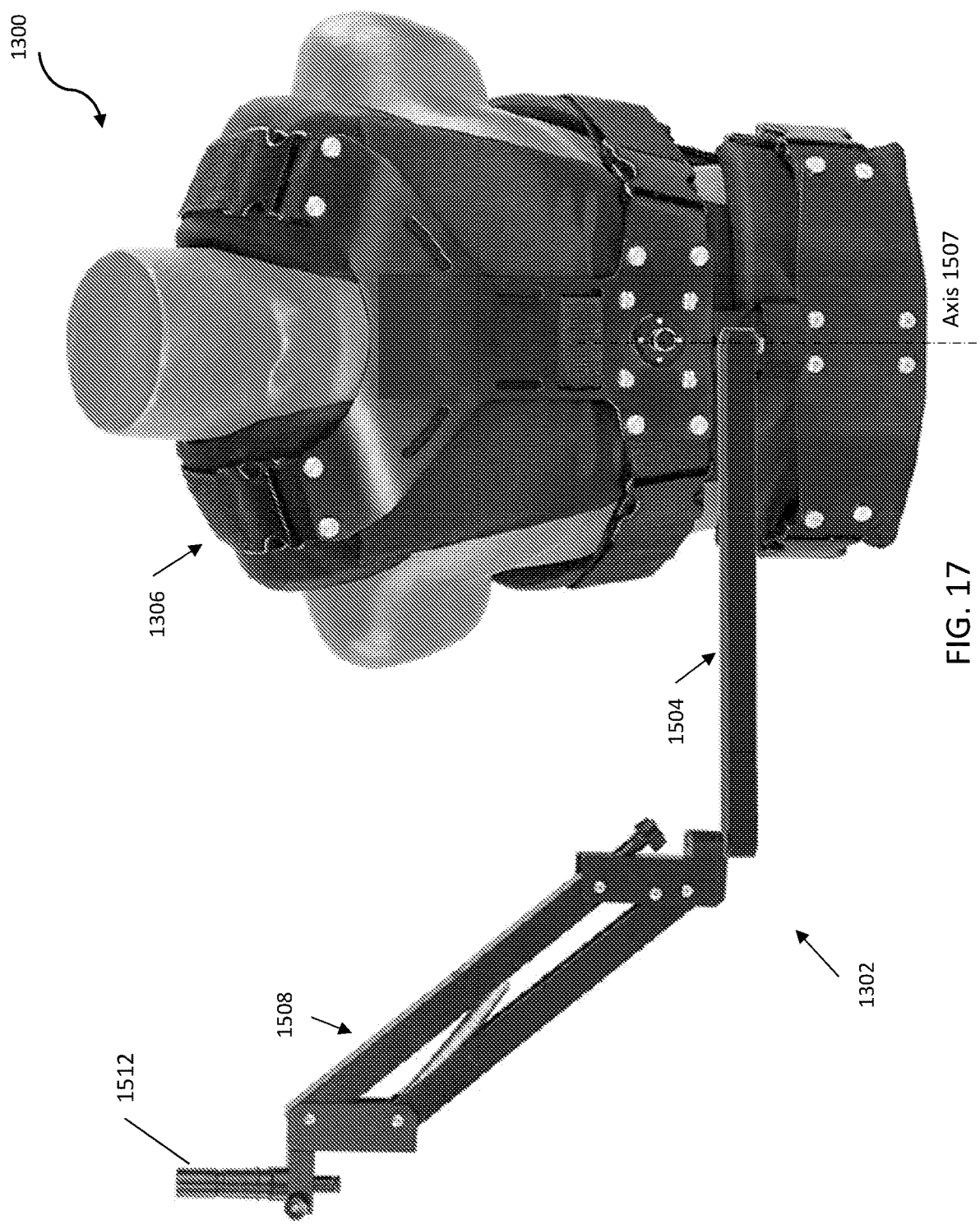
FIG. 17 depicts an example view of a body mount connected with a mechanical arm according to one or more aspects.

FIG. 17 depicts an example view of the body mount 1306 connected with the mechanical arm 1302 according to one or more aspects. The illustration shows the mechanical arm 1302 extended away from the body mount 1306. It should be noted that the mechanical arm 1302 can also be rotated around axis 1507 using the connection between the shaft 1504 and the body mount 1306, in some examples. In this manner, the mechanical arm 1302 can extend from the body mount 1306 at least at two joints—first, the coupling at the coupler 1502, and second at the coupler 1506. The extension can include translation and/or rotation.

The support apparatus 1300 facilitates the 3D scanner 120 to be to be aimed in any direction. For example, the operator can cause the 3D scanner 120 to, "roll," i.e., rotate about an axis generally parallel to the 3D scanner 120; "pan," i.e., rotate about the axis 1506, which typically is parallel to the pole mount 1308, and which is offset 90° from the roll axis; and "tilt," rotate about a substantially horizontal axis perpendicular to both the lens axis and the pan axis.

The mechanical arm 1302 includes a spring 1514. The spring 1514 is used to balance the 3D scanner 120 using a counterweight.

The extension-shaft 1508 includes a connector 1512 at the other (second) end. The connector 1512 facilitates connecting a pole mount 1308 using a gimbal 1304.

Figure 18:
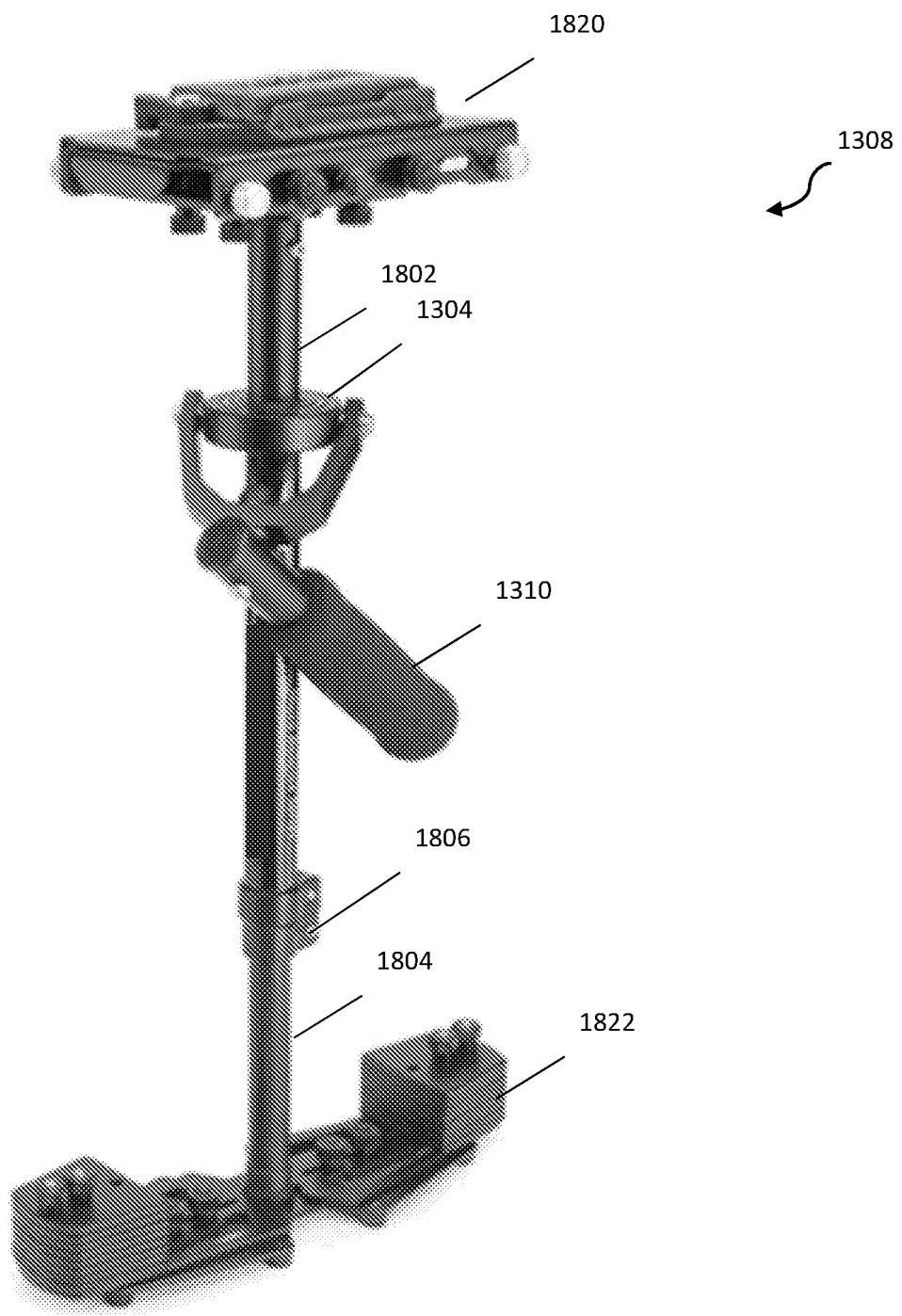
FIG. 18 depicts an example pole mount according to one or more aspects.

FIG. 18 depicts an example pole mount 1308 according to one or more embodiments. The pole mount 1308 includes a first (top) shaft 1802 and a second (bottom) shaft 1804 that connect with each other using a joint 1806, such as a socket joint, a screw joint, or any other such connecting joint. In some examples, the joint 1806 also couples with the connector 1512 of the mechanical arm 1302 to connect the pole mount 1308 with the mechanical arm 1302, and in turn, the body mount 1306.

In some aspects, the pole mount 1308 includes a gimbal 1304. The gimbal 1304 is a mechanical mount with bearings to facilitate any weight mounted on it to have the center of mass in the center of the bearings. This allows the gimbal 1304 to move without rotating the mounted weighted item (e.g., the 3D scanner). The pole mount 1308 can also include a handle 1810 that allows the operator to move the gimbal 1304.

The pole mount 1308 further includes a scanner adapter 1820 and a counterweight holder 1822. The scanner adapter 1820 facilitates mounting the 3D scanner 120 to the pole mount 1308. The counterweight holder 1822 is used to mount one or more items that counterbalance the weight of the 3D scanner 120 that is mounted on the pole mount 1308. In some examples, one or more accessories of the 3D scanner are used as the counterweight. For example, a battery pack, power adapter, digital data storage disks, communication hardware, or other such accessories can be used as a counterweight. In other aspects, other items (non-accessories) can be used as the counterweight.

The counterweight facilitates stabilizing the 3D scanning. For example, the counterweight holds the 3D scanner at a specific height depending on the spring preload (1514) of the mechanical arm 1302.

In this manner, the gimbal 1304 holds the weight of the 3D scanner 120 and facilitates the 3D scanner 120 to maintain orientation while it is being moved in the environment.

In some embodiments, mounting the 3D scanner 120 in this manner using the gimbal 1304 stabilizes the 3D scanner by preventing fast movement (shocks, shakes, etc.) of the 3D scanner 120, and hence improves (reduces deterioration of) the digital data captured by the 3D scanner 120 while being moved in the environment.

The adapter 1822 connects the 3D scanner 120 to the pole mount 1308. The adapter 1822 can be configured for a specific type (model) of the 3D scanner 120. In some examples, the adapter 1822 can facilitate connecting different types of 3D scanners 120. The adapter 1822 can include one or more electrical connections (e.g., ports) that facilitate the 3D scanner 120 to connect. The electrical connections can allow the 3D scanner to receive electrical power from the battery and/or power source that may be used as the counterweight and placed on the counterweight holder 1822 (or elsewhere). Alternatively, or in addition, the electrical connections can facilitate the 3D scanner 120 to send/receive electric signals to/from one or more accessories placed on the counterweight holder 1822 (or elsewhere). The electric signals and/or electric power can be provided to the 3D scanner via one or more cables/wires that can be routed through or along the pole mount 1308. In some embodiments, the pole mount 1308 is hollow, and the wires are routed through the hollow inside of the pole mount 1308. Alternatively, or in addition, the pole mount 1308 includes one or more wire managers (e.g., clips) that facilitate guiding and holding the wires in place when routed on the outside of the pole mount 1308.

Figure 19:
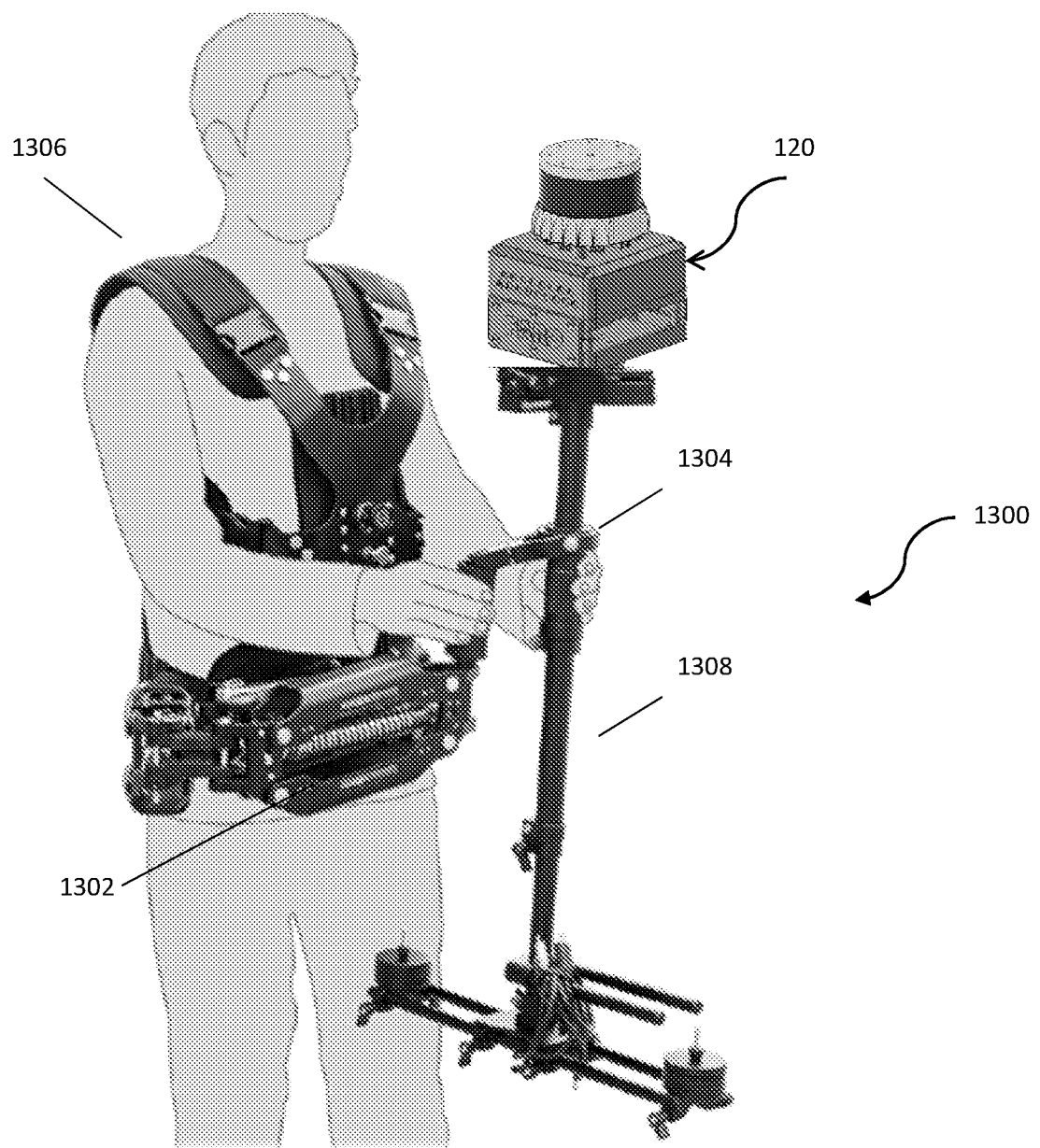
FIGS. 19-20 depict additional views of a 3D scanner being used in a portable manner by mounting the 3D scanner to a pole mount for stabilization and support according to one or more aspects.
Figure 20:
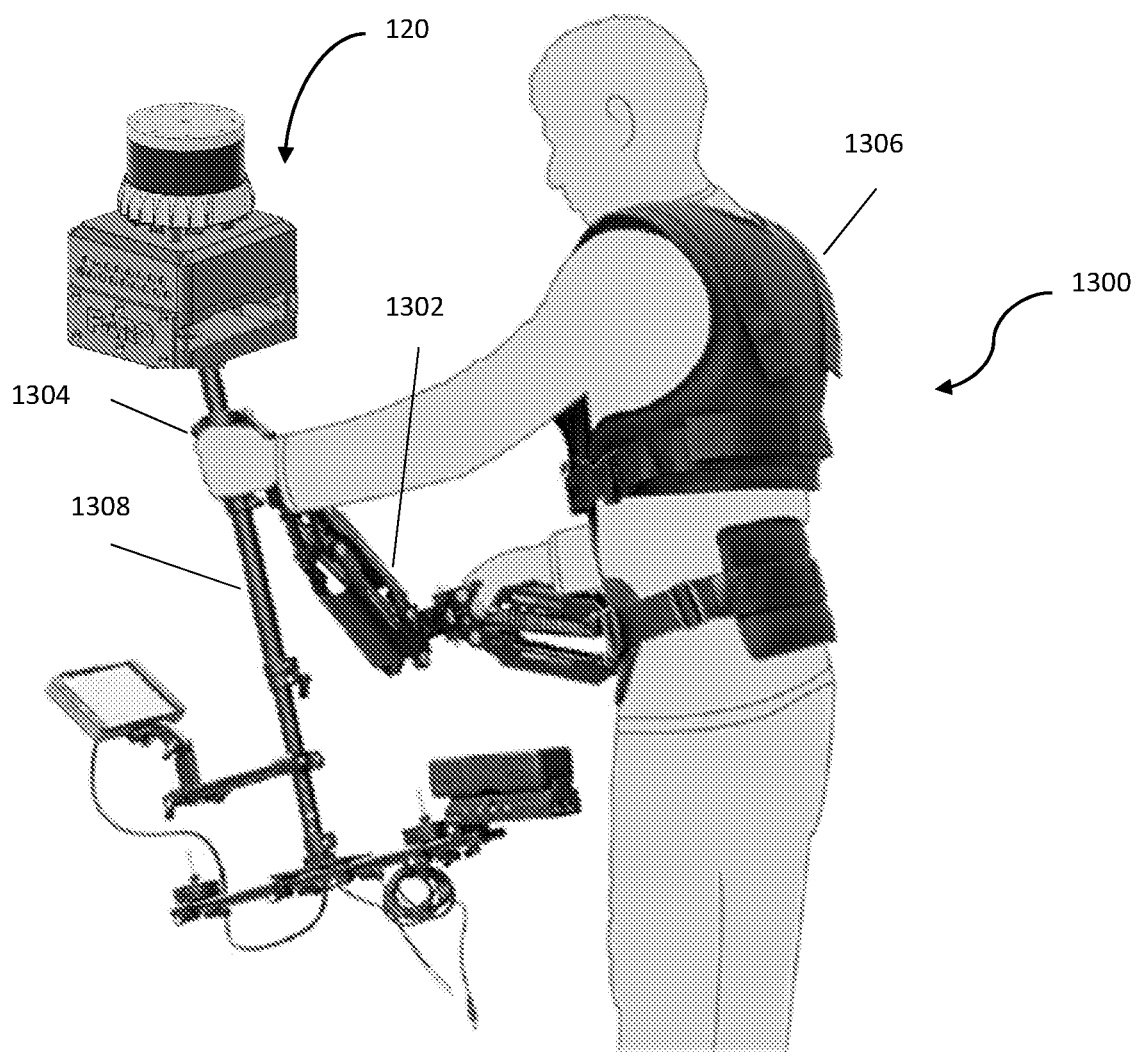

FIGS. 19-20 depict additional views of the 3D scanner 120 being used in a portable manner by mounting the 3D scanner 120 to a pole mount 1308 for stabilization and support according to one or more aspects. The pole mount 1308 is connected to a body mount 1306 to improve weight distribution of the 3D scanner 120 to reduce the operator's discomfort.

Figure 21:
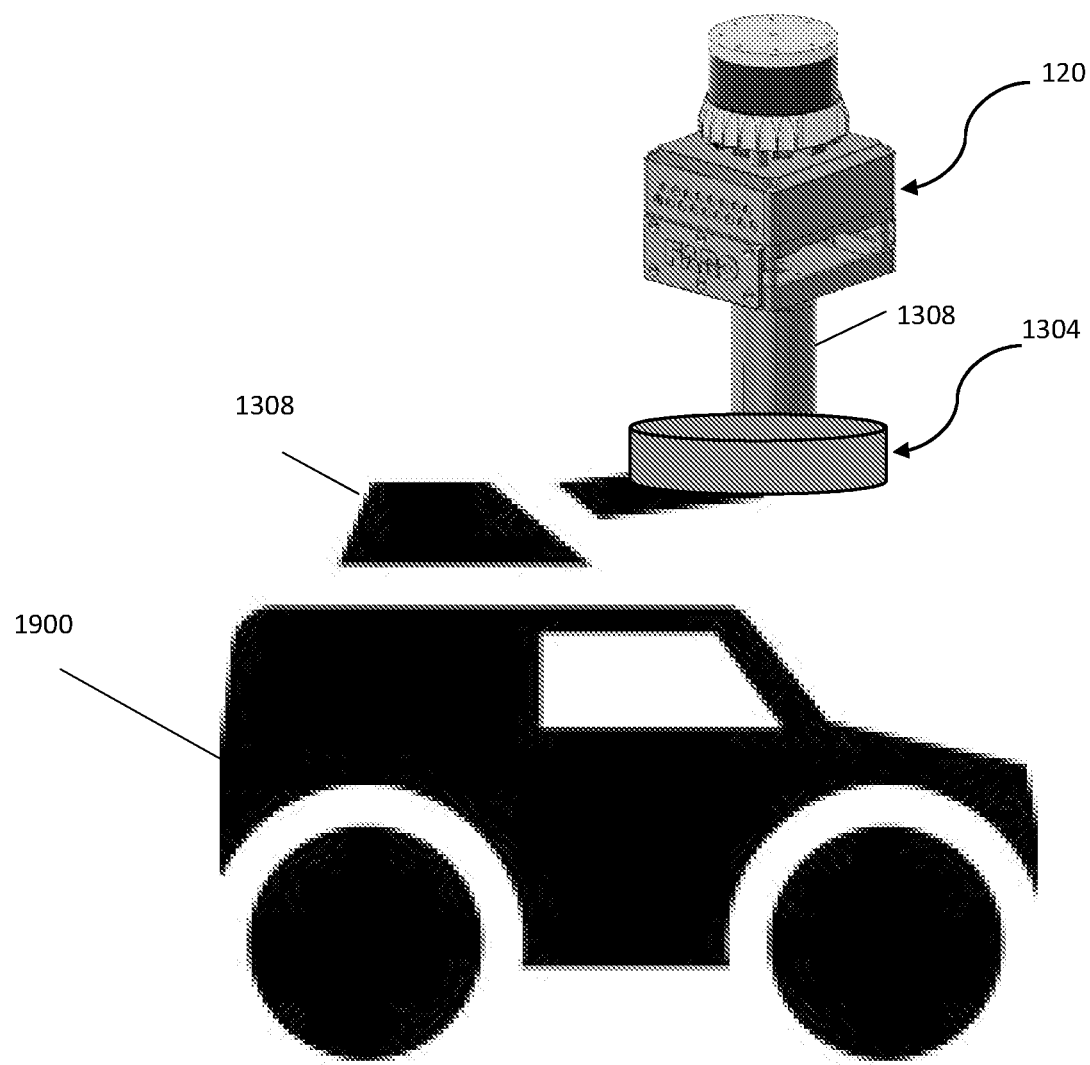
FIG. 21 depicts an example in which a 3D scanner is mounted on a vehicle.

FIG. 21 depicts another example of a portable 3D scanning system according to one or more aspects. In the illustrated example, the 3D scanner 120 is mounted using the pole mount 1308 to a movable platform 1900. The moveable platform 1900 can be a vehicle, a drone, a trolley, etc. The moveable platform 1900 can be manual, autonomous, or semi-autonomous. The pole mount 1308 includes the gimbal 1304 to stabilize the 3D scanner 120 during the motion of the moveable platform 1900. It is understood that the pole mount 1308 can be coupled to the moveable platform at a different position (e.g., at the back of the platform) instead of the position shown.

It is further understood that the drawings herein are not to scale and are for illustrative purposes. In one or more aspects, the components described herein can be arranged, scaled, and/or organized differently without moving away from the spirit of the technical solutions described herein to achieve the same technical solutions described herein.

It will be appreciated that aspects of the present disclosure are described herein with reference to flowchart illustrations and/or block diagrams of methods, apparatus (systems), and computer program products according to aspects. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

While the invention has been described in detail in connection with only a limited number of aspects, it should be readily understood that the invention is not limited to such disclosed aspects. Rather, the invention can be modified to incorporate any number of variations, alterations, substitutions, or equivalent arrangements not heretofore described but which are commensurate with the spirit and scope of the invention. Additionally, while various aspects of the invention have been described, it is to be understood that aspects of the invention may include only some of the described aspects. Accordingly, the invention is not to be seen as limited by the foregoing description but is only limited by the scope of the appended claims.

What is claimed is:

1. A mobile three-dimensional (3D) measuring system, comprising:
    a 3D measuring device that continuously transmits captured data to a computing system as the 3D measuring device is moved in an environment, the computing system generating a 2D projection as live feedback of a movement of the 3D measuring device; and
    a support apparatus, the 3D measuring device is coupled to the support apparatus, wherein the support apparatus comprises:
        a pole mount comprising a gimbal at the top of the pole mount, wherein the 3D measuring device is attached to the gimbal; and
        a counterweight at the bottom of the pole mount, the counterweight matches a weight of the 3D measuring device.

2. The system of claim 1, wherein the 3D measuring device is a time-of-flight scanner.

3. The system of claim 1, wherein the 3D measuring device comprises a LIDAR sensor to capture a digital representation of an environment as the 3D measuring system is transported in the environment.

4. The system of claim 1, wherein the computing system generates a 3D point cloud representing the environment based on the captured data and stores the 3D point cloud.

5. The system of claim 1, wherein the 3D measuring device is configured for wireless communication with the computing system.

6. The system of claim 1, wherein the 2D projection is displayed on a computing device, separate from the 3D measuring device.

7. The system of claim 6, wherein the computing device is handheld by an operator.

8. The system of claim 1, wherein the 2D projection is displayed at a first map tile level, and in response to zooming into a portion of the 2D projection, a second map tile level is displayed.

9. The system of claim 1, wherein the pole mount is coupled to a body mount that is worn by an operator.

10. The system of claim 9, wherein the body mount comprises one or more straps for the operator to wear the body mount.

11. The system of claim 10, wherein the one or more straps are adjustable.

12. The system of claim 9, wherein the pole mount is coupled to the body mount via a mechanical arm.

13. The system of claim 12, wherein the mechanical arm can extend using at least two joints.

14. The system of claim 1, wherein the pole mount is coupled to a moveable platform.

15. The system of claim 14, wherein the moveable platform is moved manually, autonomously, or semi-autonomously.

16. The system of claim 1, wherein the counterweight at the bottom of the pole mount comprises one or more accessories of the 3D measuring system.

17. The system of claim 16, wherein the 3D measuring system comprises a power source for the 3D measuring device.

18. The system of claim 1, wherein the pole mount is hollow and one or more wires are routed to the 3D measuring device through the pole mount.

* * * * *